United States Patent [19]
Seddon et al.

[11] Patent Number: 5,740,616
[45] Date of Patent: Apr. 21, 1998

[54] METROLOGICAL INSTRUMENT WITH STYLUS FOR TRAVERSING WORKPIECE

[75] Inventors: Peter Seddon; Alan John Coleman, both of Leicester; Dean Onyon, Loughborough; Trevor Dixey, Leicester, all of England

[73] Assignee: Taylor Hobson Limited, England

[21] Appl. No.: 433,496

[22] PCT Filed: Sep. 14, 1994

[86] PCT No.: PCT/GB94/02007

§ 371 Date: May 12, 1995

§ 102(e) Date: May 12, 1995

[87] PCT Pub. No.: WO95/08096

PCT Pub. Date: Mar. 23, 1995

[30] Foreign Application Priority Data

Sep. 14, 1993 [GB] United Kingdom ............ 9319037

[51] Int. Cl.⁶ ............... G01B 5/20; G01B 7/28
[52] U.S. Cl. ............... 33/554; 33/504; 33/551
[58] Field of Search ............... 33/551, 553, 554, 33/546, 1 M, 503, 504, 550, 556

[56] References Cited

U.S. PATENT DOCUMENTS

| | | | |
|---|---|---|---|
| 4,070,762 | 1/1978 | Siddall | 33/174 Q |
| 4,140,993 | 2/1979 | Bettle | 340/199 |
| 4,141,148 | 2/1979 | Noguchi | 33/174 P |
| 4,731,934 | 3/1988 | Barnaby et al. | 33/504 |
| 4,736,208 | 4/1988 | Schmidt | 364/560 |
| 4,825,557 | 5/1989 | Nettleton et al. | 33/502 |
| 4,941,265 | 7/1990 | Heiland | 33/503 |
| 5,214,962 | 6/1993 | Mahrenholz | 73/766 |
| 5,528,003 | 6/1996 | Bodin et al. | 178/18 |

FOREIGN PATENT DOCUMENTS

| | | |
|---|---|---|
| 0404597 | 12/1990 | European Pat. Off. |
| 3152731 | 7/1983 | Germany |
| 3903278 | 8/1990 | Germany |
| 549987 | 12/1942 | United Kingdom |
| 601053 | 4/1948 | United Kingdom |
| 701091 | 12/1953 | United Kingdom |
| 899285 | 6/1962 | United Kingdom |
| 1155562 | 6/1969 | United Kingdom |
| 2009409 | 6/1979 | United Kingdom |
| 2075193 | 11/1981 | United Kingdom |
| 2165361 | 4/1986 | United Kingdom |
| 2192064 | 12/1987 | United Kingdom |
| 2259367 | 3/1993 | United Kingdom |

OTHER PUBLICATIONS

Technisches Messen ATM, no. 410, Dec. 1970, Munchen, Germany, pp. 271-276, R. Kautsch "Inductive Messgrossenumformung, Teil II."

Primary Examiner—Thomas B. Will
Attorney, Agent, or Firm—Lerner, David, Littenberg, Krumholz & Mentlik

[57] ABSTRACT

A portable metrological instrument for measuring surface finish parameters has a main housing which sits on a workbench. A slidable arm can be extended or retracted over the bench so as to move a stylus over a workpiece. The stylus is fitted to a gauge mounted to the end of the arm. The mounting includes a vertically movable slider which incorporates a mechanism for lifting the stylus away from the workpiece and lowering it back. The operation of the instrument is controlled by modular software which can be reprogrammed using an external device, and the machine is operated by a control panel on the housing or by an identical control panel on a remote controller. The gauge includes an inductive sensor, and the associated circuit includes automatically adjustable error canceling devices. The control system uses the sensed position of the arm to estimate the speed of the motor which drives the arm, avoiding the need for a shaft encoder on the motor.

41 Claims, 22 Drawing Sheets

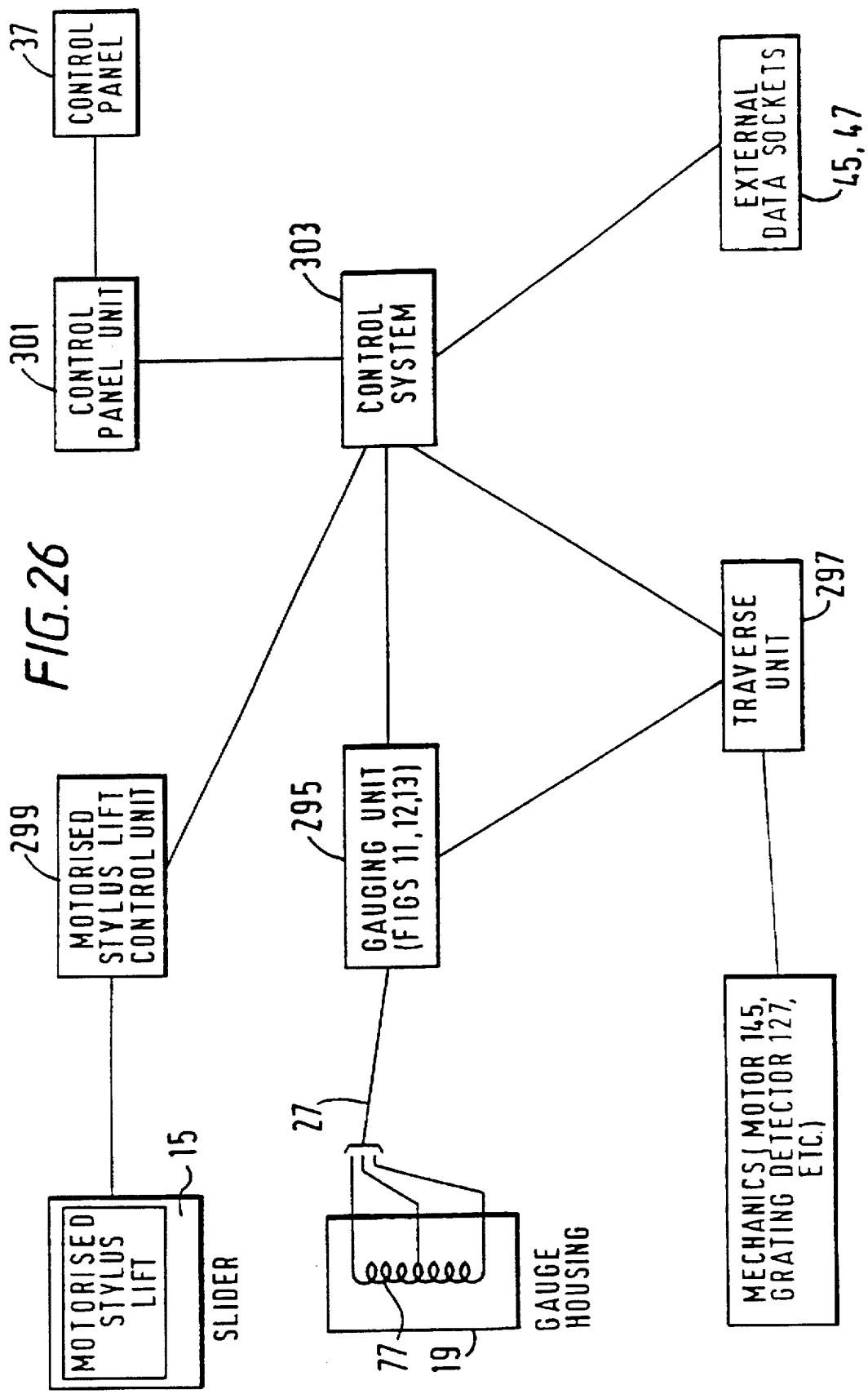

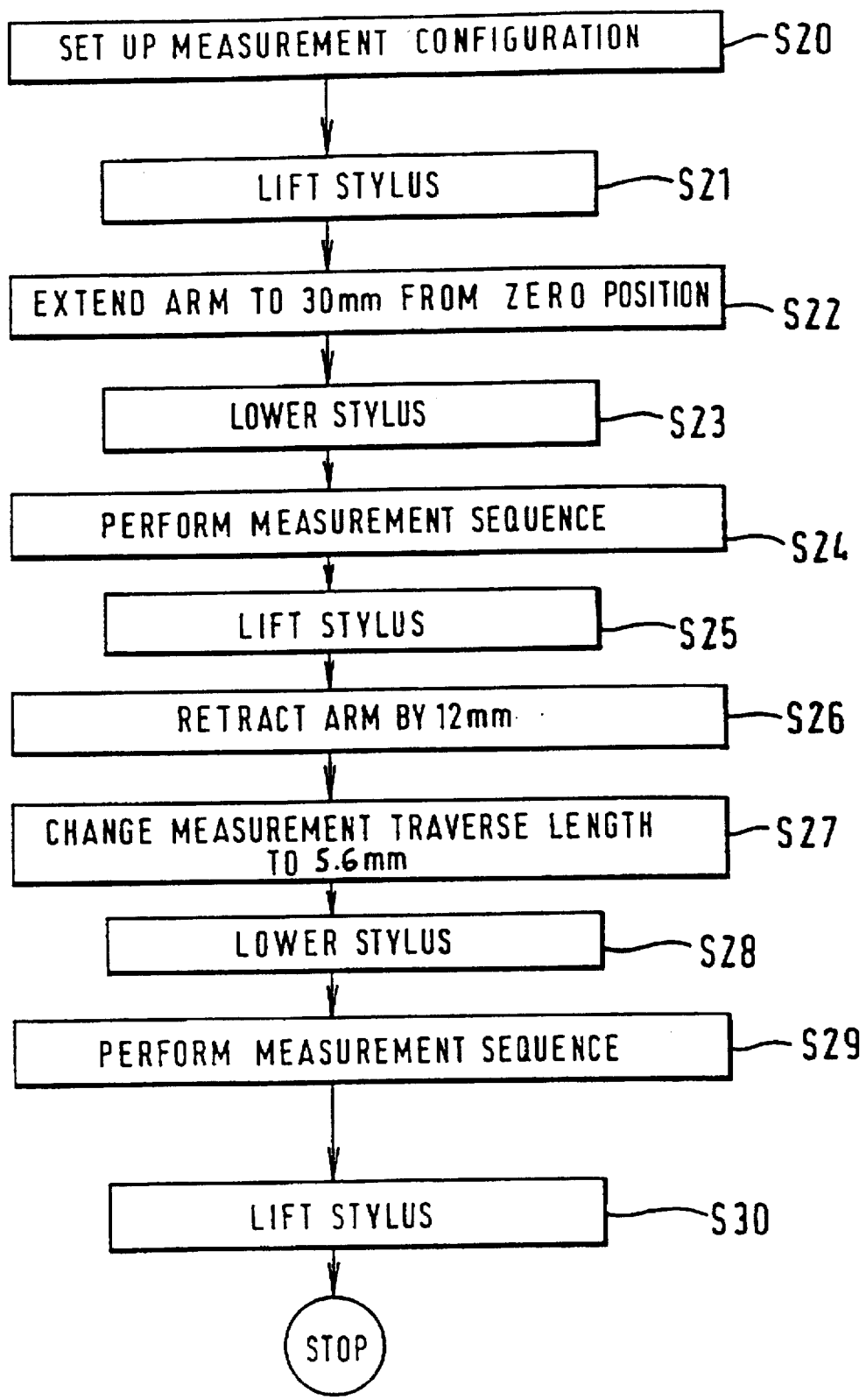

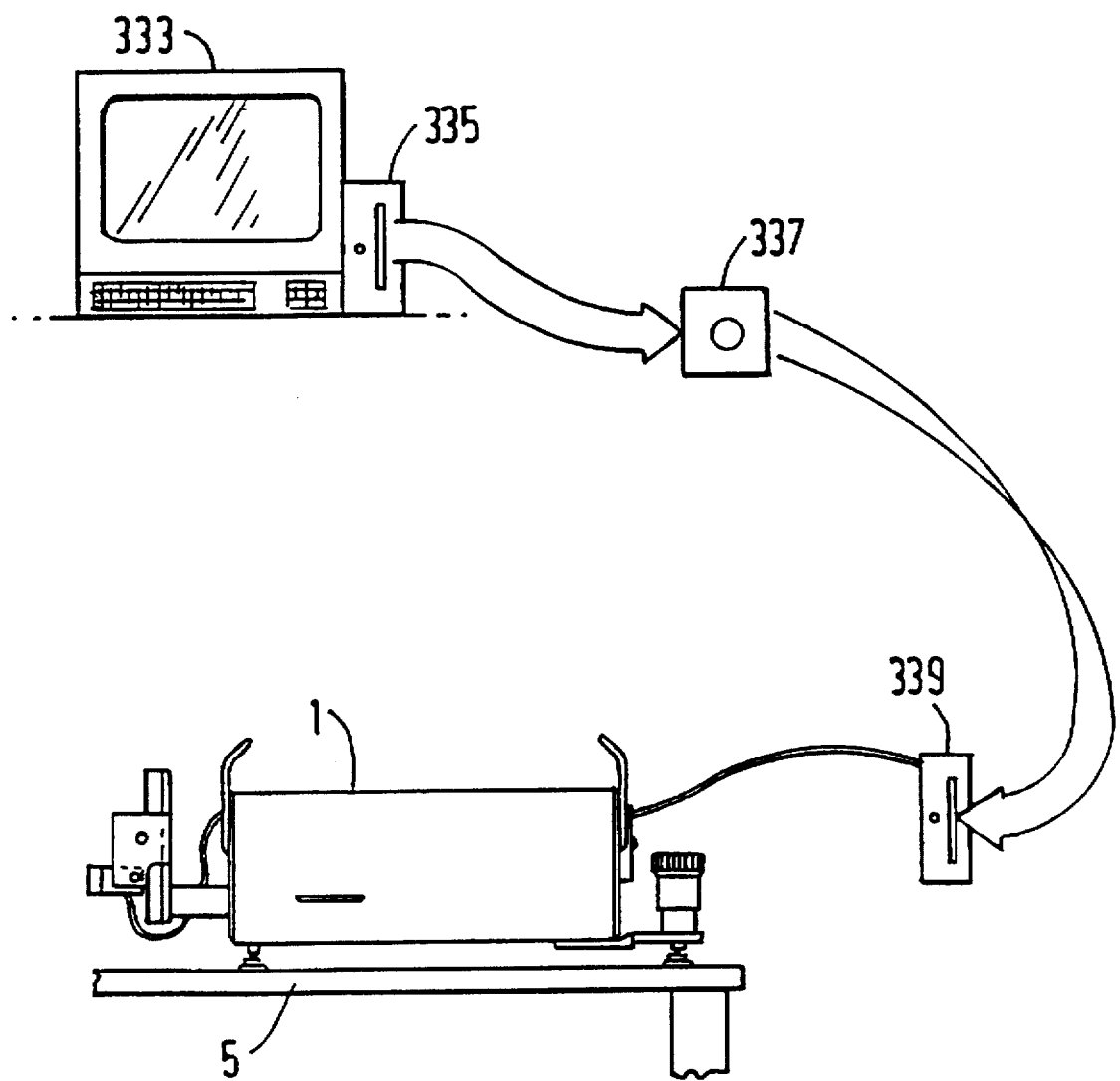

10

METROLOGICAL INSTRUMENT WITH STYLUS FOR TRAVERSING WORKPIECE

The present invention relates to a metrological instrument for measuring surface finish parameters, particularly the shape (form) and/or roughness or smoothness (texture) of a surface of a workpiece, and to methods of using such an instrument.

Metrological instruments are known in which a stylus is mounted on an arm, and the arm is slowly retracted horizontally by a drive mechanism while the tip of the stylus rests on the surface of a workpiece. A transducer outputs a signal in accordance with movement of the stylus relative to the arm on which it is mounted, and the transducer output as the arm is retracted is used to obtain information about the shape or the roughness of the surface of the workpiece. The drive mechanism which supports and retracts the arm is itself mounted on a column and is drivable up and down the column. The entire device is supported by a stand and will normally be placed on a high precision optical table which also supports the workpiece. The precise position of the arm up and down the column and the precise degree to which the arm is extended or retracted is monitored, typically using an optical grating displacement measuring system. Accordingly, the precise position of the tip of the stylus is known during a measurement operation.

Such instruments can provide very precise measurements of the form or texture of the surface of a workpiece. However, they are large and expensive. They are difficult to transport and will normally be set up on an optical table on which they will remain more or less permanently.

In one aspect, the present invention provides a portable metrological instrument for measuring surface form and/or texture, comprising an arm for supporting a stylus to be traversed over a workpiece and a drive means for driving the arm so as to traverse a stylus supported by it, arranged for the drive means to sit on a work bench next to the workpiece. The stylus and its transducer will normally be provided as a separate detachable unit mountable on the arm.

In another aspect of the present invention there is provided a portable bench-mountable metrological instrument for measuring surface roughness and/or shape, comprising an arm for supporting a stylus, a motor for driving the arm relative to an arm mounting, and an arm position detecting means mounted on the arm for detecting the position of the arm relative to the arm mounting, and control means for controlling the speed of the motor, the control means using the output from the arm position detecting means as an indication of the current speed or position of the motor and controlling the motor (e.g. controlling the motor speed) in response thereto. Preferably the motor drives the arm through a linkage. The linkage may comprise a reduction gearing so that one rotation of the motor drives the arm through less distance than it would if a reduction gearing was replaced by a direct connection. Typically, a reduction ratio in the range of 100:1 to 1000:1 is used. The linkage may comprise a flexible connection, for example a drive band, between the motor and the arm, which will tend to isolate the arm from motor vibrations.

In the past, it has been normal for the position of the motor to be detected using a shaft encoder on a motor shaft and to detect the position of the arm separately using an arm position detecting means mounted on the arm. Any flexibility or looseness in the linkage through which the motor drives the arm means that a position detector on the motor cannot indicate precisely the position of the arm and a position indicator on the arm cannot indicate precisely the position of the motor. However, it has now been found that a satisfactory device can be made in which a position detector mounted on the arm is used both for arm position data and motor position or speed data. Because the position detector is mounted on the arm, the position of the arm can still be detected very precisely, to enable high accuracy measurement using the instrument. Uncertainty over the precise position of the motor does not prevent effective motor speed control except at very low motor speeds which in practice are not required. Extreme precision in the control of the motor speed is not necessary, since the main reason for controlling the speed of the motor is to ensure that the stylus traverses over the workpiece surface at a suitable speed so that the stylus tip does not lose contact with the surface and so that the changes in position of the stylus tip can be detected with the desired accuracy without the measurement operation taking undesirably long. These requirements can still be met even if there is a slight uncertainty over the precise position or speed of the motor at any particular instant. By eliminating the shaft encoder previously used as a position detecting means on the motor, both the cost and the space taken up by the shaft encoder can be saved.

In another aspect of the present invention there is provided a portable metrological instrument for measuring surface roughness and/or shape comprising an arm for holding a stylus, means for driving the arm so as to traverse a stylus held by the arm over the surface of a workpiece, and means for driving a stylus held on the arm so that its tip moves away from a workpiece and for returning the stylus tip in the direction towards the workpiece. The means for driving the stylus may move it relative to the arm in the same manner as it moves to accommodate changes in the height of the workpiece surface as the arm traverses it over the workpiece surface. For example, if the stylus is pivotally mounted on the arm, the stylus tip may be driven away from the workpiece by rotating the stylus about the pivot. The stylus tip may be driven away from the workpiece by use of means which is also used to apply a bias force to press the stylus tip against the workpiece while the arm is traversing the stylus over the workpiece. In such an arrangement, movement of the stylus tip away from the workpiece will normally result in an output signal from the transducer which provides signals in response to movement of the stylus tip during traverse of the stylus over the workpiece.

Alternatively, the stylus tip may be lifted away from the workpiece in a different movement from the movement by which it accommodates changes in the height of the workpiece during a measurement traverse. For example, it may be lifted by pivoting about a pivot axis different from a pivot about which it swings to measure changes in the workpiece height. This movement may also move an associated stylus transducer. With such an arrangement, there may be a transducer output as the stylus lift means is operated, because the stylus tip moves through its normal operating range to hang down towards the workpiece as the stylus is lifted away from the workpiece.

An arrangement such as an abutment may be provided to define an end position of the return movement by which the stylus is moved back towards the workpiece, so that signals representing the position of the stylus tip after the stylus has been returned towards the workpiece are directly comparable with signals representing the position of the stylus tip before it was moved away from the workpiece. In this way, the means can be operated to enable two surface portions of a workpiece to be measured and a stylus tip to be lifted over an intervening part of the workpiece such as a groove or a ridge, and the measurements of the two surface portions to be treated as a single series of measurements, whereby the alignment and relative positions of the two surface portions can be determined. For example, surface portions of a piston either side of the position of a piston ring can be measured and compared with each other.

Preferably the instrument includes an electronic control system for controlling movement of the arm and other operations of the instrument. A control panel may be provided on the instrument, by which an operator can control its operation, and preferably a remote controller is also attachable.

In another aspect of the present invention there is provided a portable metrological instrument for measuring surface roughness and/or shape, comprising an arm for carrying a stylus, drive means for driving the arm to traverse a stylus mounted on the arm across a workpiece, a control panel on the instrument comprising a display and a plurality of the user-operable keys, and a remote controller for the instrument having a control panel comprising a display and a plurality of user-operable keys, the layout and functions of the display and the keys on the control panel of the remote controller being substantially identical to the layout and functions of the display and the keys on the control panel on the instrument. The feature of substantially identical appearance and function for the control panel of remote controller and the control panel on the instrument is useful because it tends to avoid confusion on the part of an operator who may control the machine through either control panel.

In another aspect the present invention provides a portable metrological instrument for measuring surface roughness and/or shape, having a control system which operates in accordance with software stored in the instrument, the software comprising instruction program means for setting out the operations the instrument is to perform, control program means for controlling the instrument to carry out the operations specified by the instruction program means, and at least one program module means for providing the control program means with program instructions required for carrying out the operations specified by the instruction program means, and the metrological instrument comprising means to enable at least the instruction program means and the program module means to be replaced.

The instruction program means and the program module means may be stored in a re-writable memory in the metrological instrument, and the metrological instrument may contain a data communication port and associated means for re-writing the instruction program means and the program module means in the re-writable memory. Alternatively, the instruction program means and the program module means may be stored on a removable data carrier such as a magnetic card or disc, so that they are replaced by substituting the magnetic card or disc by another magnetic card or disc having the replacement instruction program means and program module means recorded on it.

Preferably, a first part of the control program means, which communicates with the instruction program means and with each of the program module means and with a second part of the control program means, is also arranged to be replaceable. The first part of the control program means is sometimes known as the "kernel".

With this software arrangement, a particular instruction program means can be loaded into the metrological instrument together with an appropriate library of program module means, so as to configure the metrological instrument to perform a particular measuring task or set of measuring tasks within a particular operating environment, and output particular results, in accordance with the requirements of the user. If the user wishes to change the task or tasks which the metrological instrument performs or wishes to alter the environment or the manner in which data is output, the instruction program means and the associated library of program module means can be replaced accordingly.

Preferably, the user is provided with programming apparatus such as a personal computer together with an overall master library of program module means and an instruction design program means, whereby a user can use the instruction design program means running in the programming apparatus to create an instruction program means in accordance with the user's requirements and to select from the master library of program module means those program module means required for the library to accompany the instruction program means in the metrological instrument, and after completion of this operation the new instruction program means and the associated library of program module means are downloaded into the metrological instrument. The replacement program means can be downloaded in any convenient manner. For example, if memory means in the metrological instrument is to be re-written, the programming apparatus may be connected directly to the metrological instrument or alternatively the replacement programs may be written on to a data carrier such as a magnetic floppy disc and this disc can then be transferred to a disc reader connected (preferably detachably) to the metrological instrument. If a program carrier in the metrological instrument is to be replaced, the new instruction program means in the library of program module means in the programming apparatus can be written to a suitable carrier, which is then inserted into the metrological instrument.

With such an arrangement, the bulk and computing power of the programming apparatus are not required to be incorporated in the metrological instrument, and a single programming apparatus can be used to re-configure a plurality of metrological instruments. Additionally, by appropriate design of the instruction design program means, the programming apparatus can be a personal computer, terminal or other apparatus of general utility in the user's establishment, which can be used at other times to perform useful functions unrelated to the metrological instrument.

Additionally, this system enables an experienced person to configure the metrological instrument so that it will perform only the task or tasks which are desired and output the data only in the desired manner, so that the metrological instrument can then be operated by a less experienced operator, and the less experienced operator is prevented from accidentally causing the instrument to perform unwanted tasks or output data in an unwanted manner, because these operations have not been made available through the instruction program means or are not performable because a necessary program module means is not available in the instrument. However, if later it is determined that some alternative operations are required, the metrological instrument can be reconfigured appropriately by replacing the instruction program means and the associated library of program module means. In this manner, the metrological instrument is given a flexibility of operation but at the same time there is a reduction in the risk of an inappropriate use of the instrument's capabilities during operation.

In accordance with another aspect of the present invention there is provided a programmable metrological assembly comprising a portable metrological instrument for measuring surface roughness and/or shape, having a computerised control means (e.g. a microprocessor) operating in accordance with a stored program, a computerised programming means for changing or replacing some or all of the stored program of the metrological instrument, and communication means for carrying replacement program instructions from the programming means to the metrological instrument.

In another aspect the present invention provides a method of reprogramming a reprogrammable portable metrological instrument for measuring surface roughness and/or shape, the method comprising the steps of:

(a) using a programming apparatus separate from the metrological instrument to create an instruction program means defining a sequence of operations which the metrological instrument is to perform, and to select one or more program module means comprising instructions to enable the metrological instrument to carry out a respective one or ones of the operations specified in the instruction program means, the program module means being selected from a library of program module means provided to the programming apparatus, and (b) downloading from the programming apparatus to the metrological instrument the instruction program means and the selected one or more program module means, to enable the metrological instrument to operate in accordance with the instruction program means without connection to the programming apparatus during operation.

The programming apparatus may be set up so that a new instruction program means is created under the control of an operator, and during or after the creation of the instruction program means the programming apparatus automatically identifies the program module means which will be required to enable the metrological instrument to carry out the operations specified by the instruction program means. If desired, the programming apparatus can then proceed to select the program module means for downloading on the basis of this identification, so that substantially the only task of the operator is to identify the operations to be carried out and thereby control the creation of the instruction program means.

According to another aspect of the present invention there is provided a metrological instrument for measuring surface roughness and/or shape, comprising an arm for holding a stylus and traversing the stylus over a workpiece, an electronic circuit means for connection to a coil of an inductive transducer arranged so that movement of the stylus tip causes relative movement between the coil of the transducer and a core for the coil, the circuit means comprising a component which is adjustable in response to a control signal so as to alter a parameter of the component and thereby affect the operation of the circuit means, and the metrological instrument having a mode of operation in which it generates the aforementioned control signal in response to an error in the operation of the circuit means, thereby to adjust the component automatically so as to reduce the error. Preferably the component can be set to retain its adjustment setting in the absence of power.

In an embodiment for use when the coil of the transducer is tapped at first and second points and a third point intermediate to the first and second points, and the coil of the transducer is caused to oscillate in use, the adjustable component is connected in a path between the first and second taps of the coil and is adjustable to vary the phase difference between signals appearing at two of the taps of the coil to compensate for inaccuracies in resistance of the part of the coil between the first tap and the third tap relative to the resistance of the part of the coil between the second tap and the first tap.

In an embodiment in which the coil of the transducer is caused to oscillate, the circuit means compares first and second signals each obtained by combining signals from a plurality of points along the coil, and the adjustable component is connected to alter the phase of one of the first and second signals.

Preferably there is more than one adjustable component in the circuit means.

In this aspect of the invention the metrological instrument is not necessarily portable and the aspect can be applied to non-portable instruments as well as to portable instruments.

An aspect of the present invention provides a metrological instrument for measuring surface roughness and/or shape, comprising an arm for holding a stylus and traversing the stylus over a workpiece, and circuit means for receiving a signal from a coil of a transducer arranged so that movement of the stylus as it traverses over a workpiece causes relative movement between the coil and a core, the current through the coil being caused to oscillate in use and the circuit means receiving first and second signals from the coil and comparing their amplitudes, the circuit means comprising an adjustable element which is adjustable to affect the relative phase between the first and second signals in response to a control signal and the metrological instrument having a mode of operation in which the control signal is output to the adjustable component in response to a detected error in the phase between the first and second signals thereby automatically to adjust the component to reduce the phase error.

In an embodiment, the amplitude of the first signal varies with relative movement between the core and the coil of the transducer, whereas the amplitude of the second signal is substantially constant, and the adjustable component alters the phase of the second signal.

This aspect of the present invention can be applied both to portable and non-portable metrological instruments.

By providing one or more adjustable components which are adjustable in response to control signals, and causing the metrological instrument to have a mode of operation in which such control signals are provided in response to detected errors, the instrument can be provided with a self-adjustment mode in which it automatically adjusts the components to reduce the associated errors. This can release the operator from the need to detect the errors and adjust components manually. This provides the more convenient operation. Additionally, it can provide a more reliable error adjustment operation, particularly where the operator may be tempted to omit the adjustment operation or may find it difficult to detect errors or to make adjustments.

Another aspect of the present invention provides a metrological instrument for measuring surface roughness or shape, comprising an arm for holding a stylus and traversing the stylus over a workpiece and circuit means for connection to a coil of a transducer associated with the stylus so that movement of the stylus as it traverses over the workpiece causes relative movement between the coil of the transducer and a core, the circuit means comprising an oscillator having first and second outputs for connection to first and second taps of the coil, a first resistor in series with the first output of the oscillator, a second resistor in series with the second output of the oscillator, and an adjustable resistive component connected between the first resistor and the second resistor on their sides away from the oscillator. Preferably the adjustable resistive component comprises a potentiometer having an adjustable centre tap connected to a potential source. This arrangement can be connected so as to permit adjustment of the adjustable resistive component to vary the relative phase between signals obtained from the first and second taps on the coil.

By selection of the values of the first and second resistors, the approximate value required for the adjustable resistive component can be selected, and accordingly it is possible to design such a circuit so that it is suitable to use a component which is adjustable automatically in response to a control signal as the adjustable resistive component. This enables an automatic adjustment mode.

This aspect of the present invention may be used with portable or non-portable metrological instruments.

According to another aspect of the present invention there is provided a metrological instrument for measuring surface roughness and/or shape, comprising: an arm for mounting a stylus and traversing it over a workpiece; and circuit means for connection to a coil arranged so that movement of the stylus as it traverses over the workpiece causes relative movement between the coil and a core, the circuit means comprising a capacitance for connection in parallel with the coil to form a tuned circuit, an oscillator for driving the tuned circuit, and resistors between the oscillator and the capacitance. The resistors permit slight phase differences between the tuned circuit and the oscillator, and permit the capacitance to form a tuned circuit with the coil rather than being driven directly by the oscillator. As compared with an arrangement in which the oscillator drives the coil directly and no resistors or capacitance are provided, the arrangement of this aspect of the present invention can lower the effective impedance of the coil with an improvement in signal-to-noise performance. Additionally, the tuned circuit rejects unwanted frequencies, and therefore can reduce the effect of noise frequencies such as the third harmonic of the oscillator frequency which may undesirably be introduced, e.g. by the construction of the transducer.

This aspect of the present invention can be used with portable or non-portable metrological instruments.

Embodiments of the present invention, given by way of non-limiting example, will now be described with reference to the accompanying drawings, in which:

FIG. 26 is a schematic diagram of the electronic circuitry;

FIG. 30 is a flow diagram of a second example of a user program; and

FIG. 31 is a diagram of a re-programming arrangement.

OVERVIEW AND GENERAL ARRANGEMENT

Figure 1:
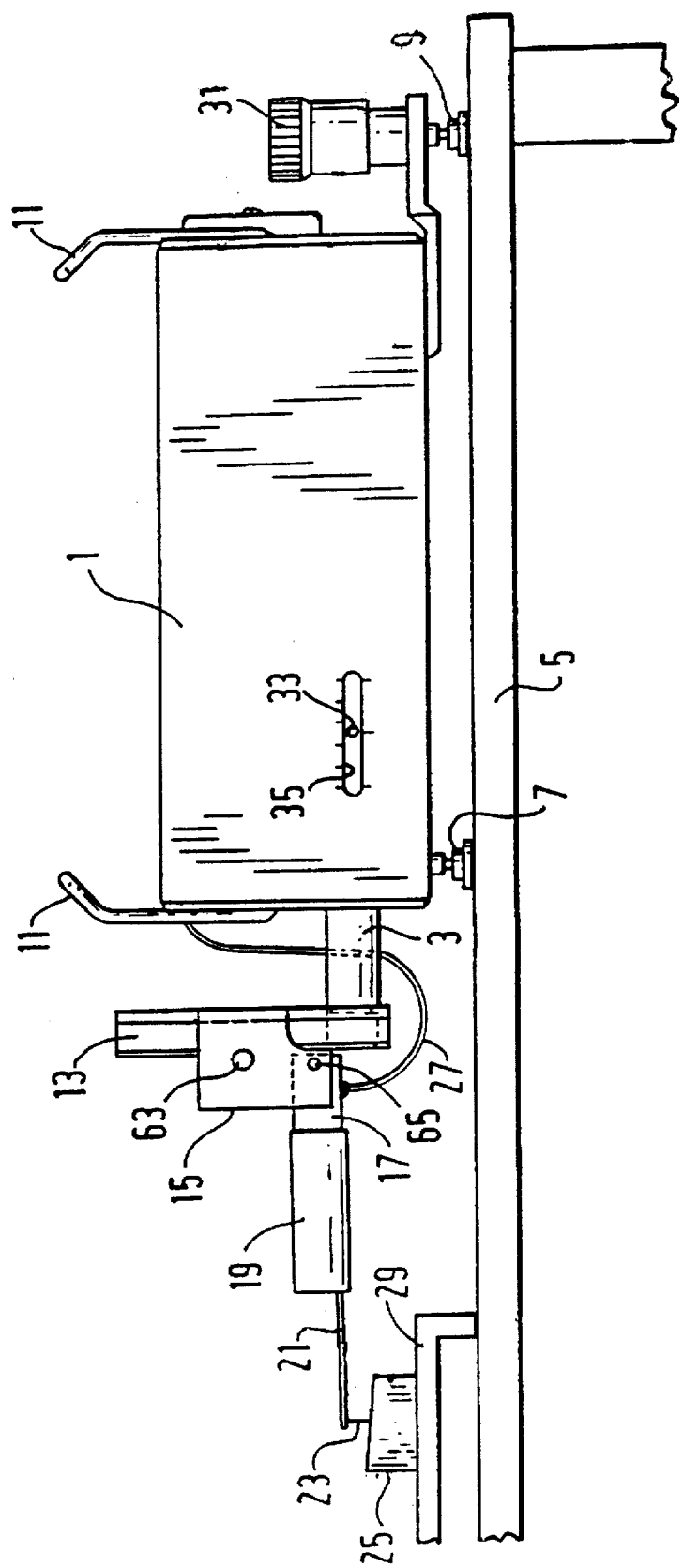
FIG. 1 is a view of a metrological instrument embodying the invention, seen from the front side.

FIG. 1 shows a metrological instrument embodying the present invention set up to measure the shape or the roughness of a surface of a work piece.

The main housing 1 of the gauge carries electronic circuitry for controlling its operation and processing data it obtains about the surface of the workpiece, and a drive means for driving an arm 3 (also known as a datum bar)-horizontally along its axis. The instrument is designed to be bench-mounted, in that the main housing 1 stands on a work bench 5 (normally an optical table) on feet 7, 9. The main housing 1 is between 30 cm and 40 cm long, and is provided with handles 11 so that the instrument is readily portable, in the sense that a single person can pick it up and carry it to another work bench.

The end of the arm 3 which protrudes from the main housing 1 carries a vertical slideway 13, on which a slider 15 can move up and down. The slider 15 carries a gauge holder 17.

A removable gauge comprises a gauge housing 19 fitted onto the gauge holder 17, and a stylus 21 which is pivotally mounted on the gauge housing 19. In use, the tip 23 of the stylus rests on the surface of the workpiece 25 to be measured, and the gauge housing 19 carries a transducer for detecting vertical movement of the stylus tip 23. An electrical connection between the gauge housing 19 and the gauge holder 17 connects the transducer to a flexible trailing lead 27 which extends between the gauge holder 17 and the main housing 1, thereby to connect the transducer of the gauge to the electrical circuitry in the main housing 1.

In use, the workpiece 25 is supported on the bench 5 by a workpiece holder 29 and the metrological instrument is arranged so that the stylus tip 23 rests on the surface of the workpiece 25, normally at a point near the edge of the workpiece 25 remote from the main housing 1 of the instrument. In a measuring traverse, the arm 3 is driven so as to be retracted slowly into the main housing 1, dragging the stylus 21 with it and causing the stylus tip 23 to traverse over the surface of the workpiece 25. The stylus tip 23 will move up and down as necessary to follow any changes in the height of the surface of the workpiece 25, and this movement will be detected by the transducer in the gauge housing 19 and corresponding signals will be provided through the flexible trailing lead 27 to the electrical circuitry in the main housing 1. In this way, the roughness of the surface of the workpiece 25 can be measured, and also the overall shape or form of the surface of the workpiece 25 can be measured provided that the variations in height remain within the range of the transducer in the gauge housing 19. Those skilled in the art will be familiar with the detection of surface roughness and shape by traversing a stylus over the surface.

The angle between the plane of the bench 5 and the axial direction (and direction of movement) of the arm 3 can be adjusted by adjusting the height of the foot 9 remote from the gauge. This is done by turning an adjustment screw 31 provided on the foot 9. The height of the stylus 21 can be adjusted to take into account the height of the workpiece 25 and the height of the workpiece holder 29 by moving the slider 15 up or down on the vertical slideway 13.

The precise position of the arm 3 in its horizontal movement into and out of the main housing 1 is monitored by the electrical circuitry by means of an optical grating displacement sensor, in a manner which will be familiar to those skilled in the art. Additionally, for the benefit of an operator the position of the arm within its range between fully extended and fully retracted is indicated by the position of an illuminated spot 33 along a scale 35 visible on the front side of the housing towards the normal position of the operator in use. The scale 35 is preferably marked with gradations in millimeters and in tenths or twentieths of an inch. The total range of movement of the arm 3 between fully extended and fully extracted is preferably about 5 centimeters (about 2 inches).

For convenience, the side of the main housing 1 which can be seen in FIG. 1, and which is the side normally towards the operator in use, will be referred to as the "front side", and the opposite side of the main housing 1 will be referred to as the "rear side". The end to the left in FIG. 1, from which the arm 3 extends, will be referred to as the "gauging end", and the end to the right in FIG. 1, towards the adjustable foot 9, will be referred to as the "non-gauging end".

Figure 2:
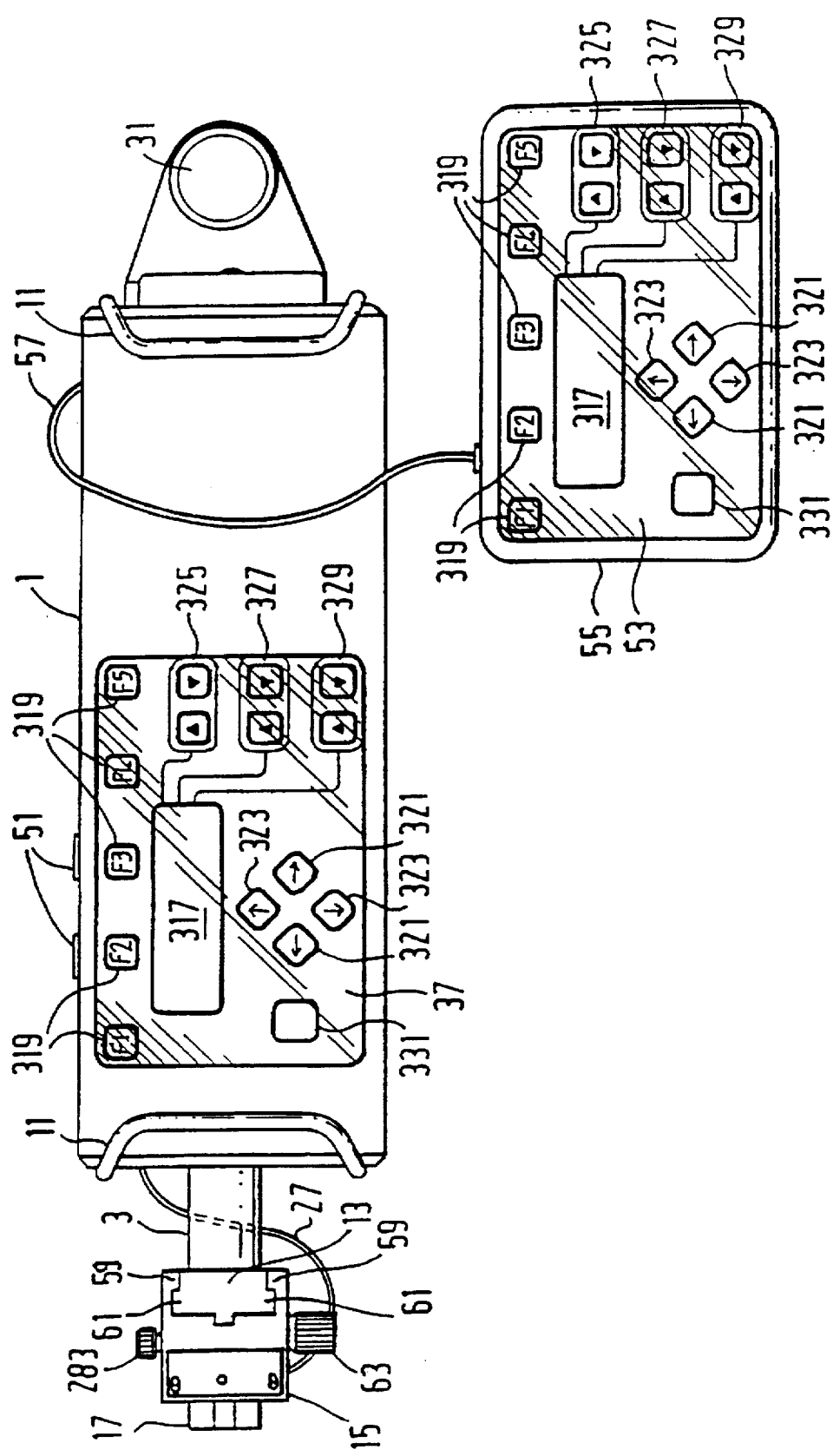
FIG. 2 is a view of the instrument from above.

FIG. 2 is a view of the metrological instrument of FIG. 1 from above. In FIG. 2, the instrument is shown with no gauge fitted to the gauge holder 17, and the bench 5, workpiece 25 and workpiece holder 29 are also not shown. On the top surface of the main housing 1 a control panel 37 is provided, through which an operator can control the operation of the instrument.

Figure 3:
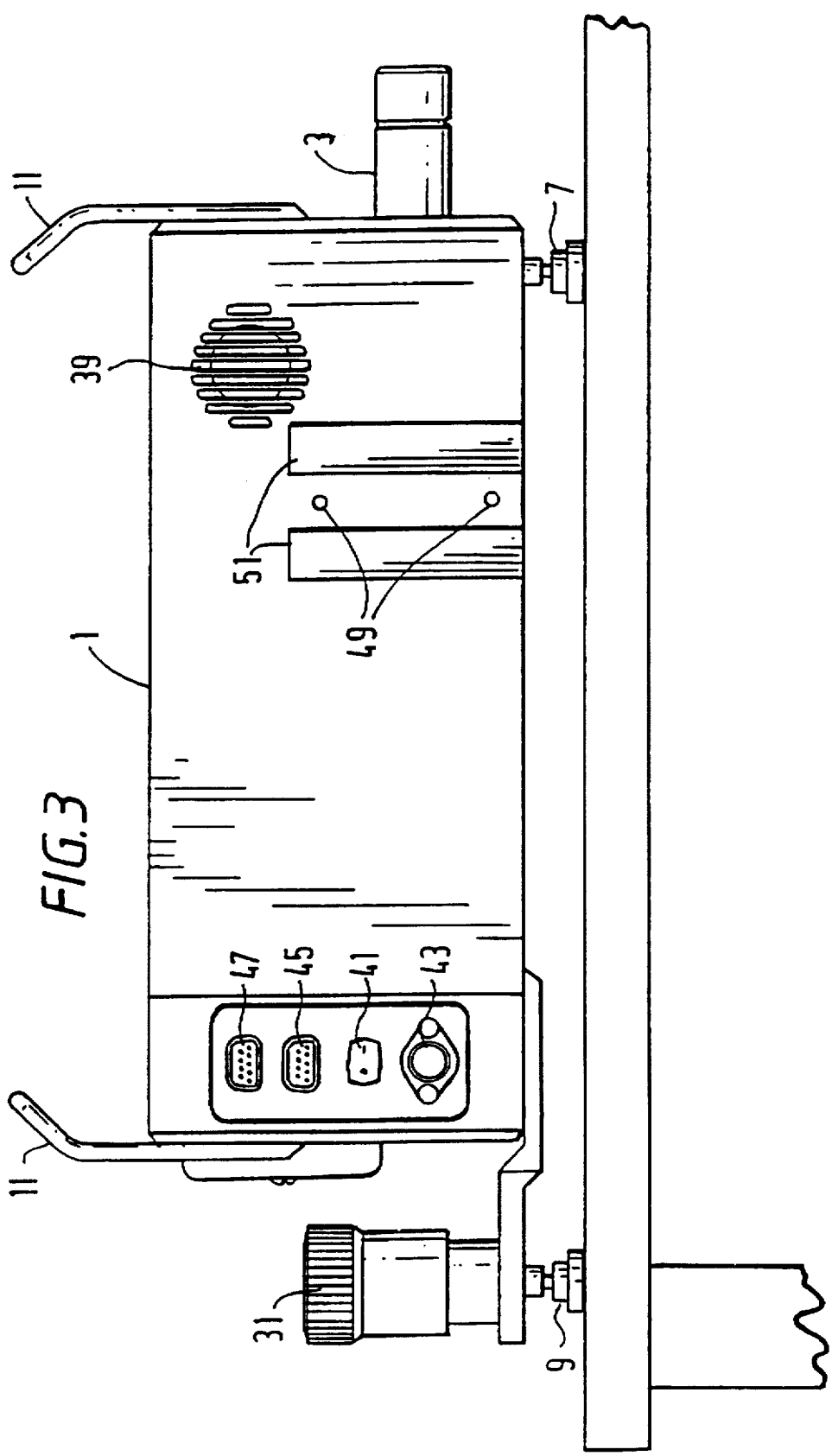
FIG. 3 is a view of the instrument from the rear side.

FIG. 3 is the view of the instrument from the rear side. In FIG. 3, the vertical slideway 13, slider 15 and gauge holder 17 are omitted. In practice, it is possible to remove these from the arm 3 but this is not normally done.

An outlet grille 39 is provided in the rear side of the main housing 1 for a cooling fan mounted inside the main housing 1. Additionally, there is provided on the rear side of the main housing 1 an on/off switch 41, a socket 43 for receiving an electric power cable, a socket 45 for parallel data connection to a remote control or any other apparatus whose operation is required to co-operate with the operation of the instrument, and a socket 47 for connection for serial data communication.

Although the present metrological instrument is designed for free-standing use on a bench 5, a user may wish on occasion to use the instrument with a conventional column and stand arrangement. Accordingly, holes 49 are provided in the rear side of the main housing 1 to which a wedge-shaped dove-tail connector may be fitted for mounting the instrument to a column, and either side of the holes 49 raised precision faces 51 are provided for positioning the instrument against corresponding precision faces on a column.

Returning to FIG. 2, the operator can control the instrument through a control panel 53 of a remote controller 55 instead of the control panel 37 provided on the main casing 1. The remote controller 55 is connected to the main housing 1 through a cable 37 which is plugged into the data socket 45 shown in FIG. 3. The control panel 53 on the remote controller 55 has the same layout of keys and a display, and the same mode of operation, as the control panel 37 on the main housing 1. By providing the same layout and the same operation for the two control panels, confusion is minimised for an operator who switches between the control panels.

Figure 4:
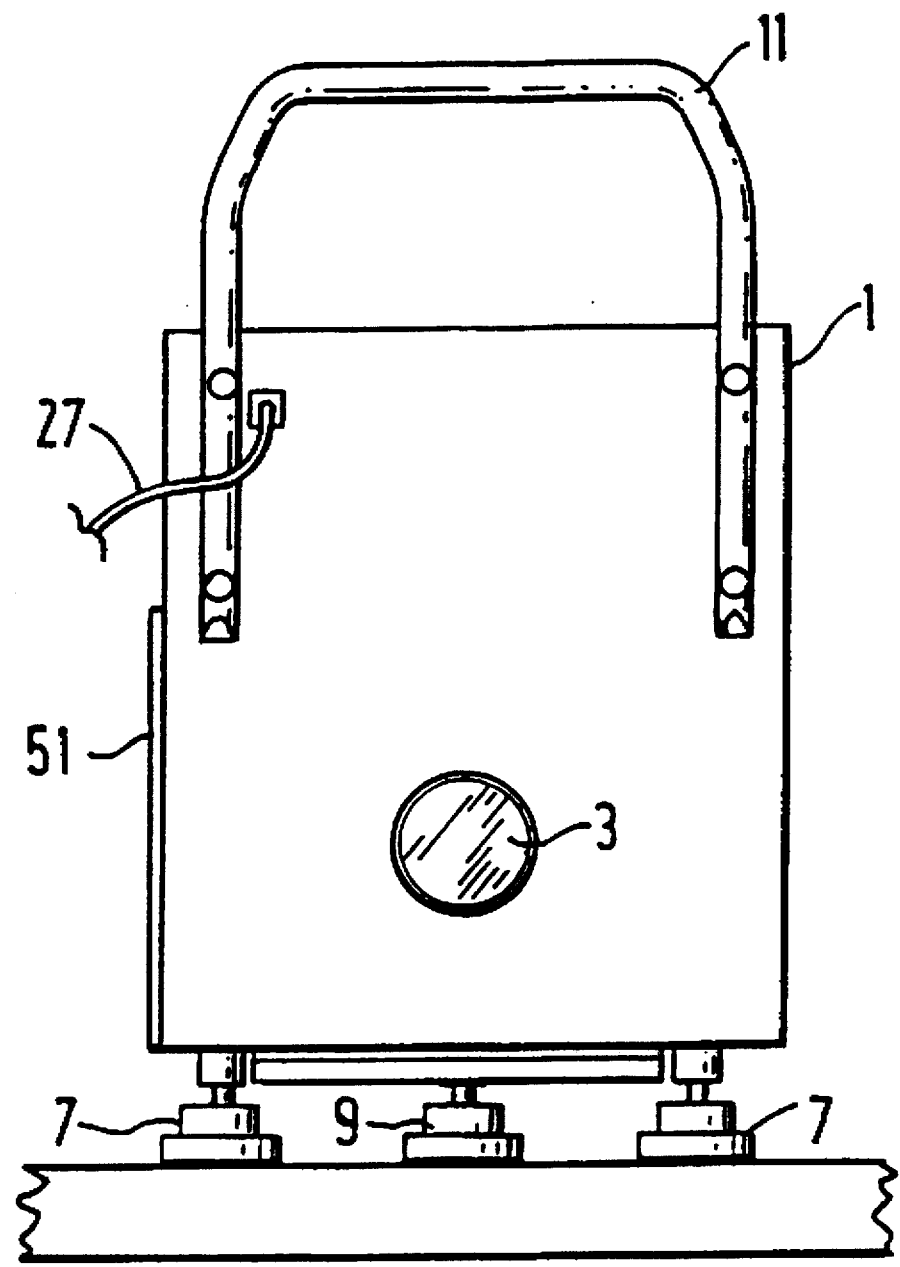
FIG. 4 is a view of the instrument from the gauging end.

FIG. 4 is a schematic view of the main housing 1 from the gauging end. The arrangement of the handles 11 can be seen in this Figure. It can also be seen from FIG. 4 that there are two feet 7 at the gauging end of the main housing 1 but there is only one adjustable foot 9 at the non-gauging end. Accordingly, the main housing is given a stable 3-point mounting on the bench 5.

Figure 5:
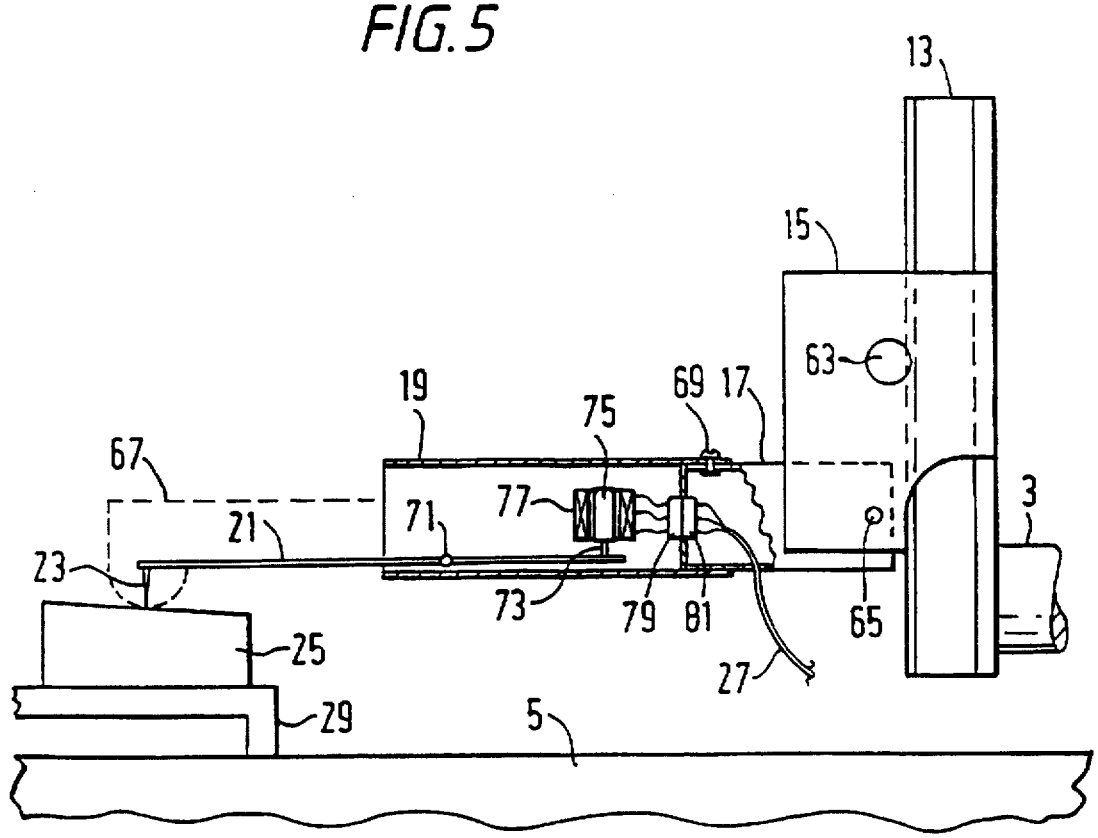
FIG. 5 is a more detailed view of the gauge and supporting arrangement.

FIG. 5 shows in more detail the parts mounted on the end of the arm 3. The vertical slideway 13 is generally T-shaped in horizontal section, as can be seen in FIG. 2, and the slider 15 has flanges 59 which extend behind the arms 61 of the slideway 13 to hold the slider 15 onto the slideway 30. A knob 63 on the front side of the slider 15 is connected to a wheel with a tapering circumferential slot which is pressed against a ridge on the face of the vertical slideway 13, so that rotation of the knob 63 drives the slider 15 up and down the vertical slideway 30, in a known manner. The ridge is pressed into the tapering slot sufficiently hard that the wheel does not rotate in the absence of manual operation of the knob 63, so that the slider 15 does not move down the slideway 13 under the influence of gravity.

The gauge holder 17 is mounted on the slider 15 by a pivot 65. Normally the gauge holder 17 is pressed firmly against an abutment so that it does not rotate about the pivot 65, so that the gauge housing 19 does not move relative to the arm 3 in use. However, the gauge holder 17 can be released so as to become rotatable about the pivot 65, to enable the stylus housing 19 to be lifted by a skid 67 in accordance with British Standard 1134. A skid 67 is shown in the broken lines in FIG. 5, fitted rigidly to the gauge housing 19. The skid 67 contacts the workpiece 25 with a surface having a large radius of curvature, and lifts the stylus tip 23 over large scale changes in height of the workpiece 25 by lifting the gauge as a whole. A skid is used for measuring surface roughness of a curved surface, and serves to remove the overall shape of the surface from the gauge output and to prevent the large changes in overall height of the surface from causing the transducer in the gauge to go out of range.

A motorised system for rotating the gauge holder 17 about the pivot 65 independently of any skid 67 is described later in this specification.

The gauge housing 19 is a push fit onto the gauge holder 17, and a locking screw 69 can be tightened to lock the gauge housing 19 against the gauge holder 17 so that they are fixed rigidly together. The stylus 21 is mounted on the gauge housing 19 by a pivot 71 near the end of the gauge housing 19 away from the gauge holder 17. The stylus 21 extends towards the gauge holder 17 beyond the stylus pivot 71, and near its end towards the gauge holder 17 a pin 73 carries a metal core 75 which extends within an inductor coil 77 mounted in the gauge housing 19. The core 75 and inductor coil 77 form an inductive transducer for detecting stylus movement in a manner known to those skilled in the art. The inductor coil 77 is tapped at each end and in the centre, and movement of the core 75 within the coil 77 alters the inductive balance between the two halves of the coil.

Wires from three taps of the inductor coil 77 pass to a connective block 79 in the gauge housing 19, which makes electrical connection with a corresponding connector block 81 in the gauge holder 17. In this manner, the three taps of the inductor coil 77 are connected to three wires in the flexible trailing lead 27, and in this way the inductor coil 77 is connected into a gauging circuit in the main housing 1 of the instrument.

Traverse Unit Mechanism

Figure 6:
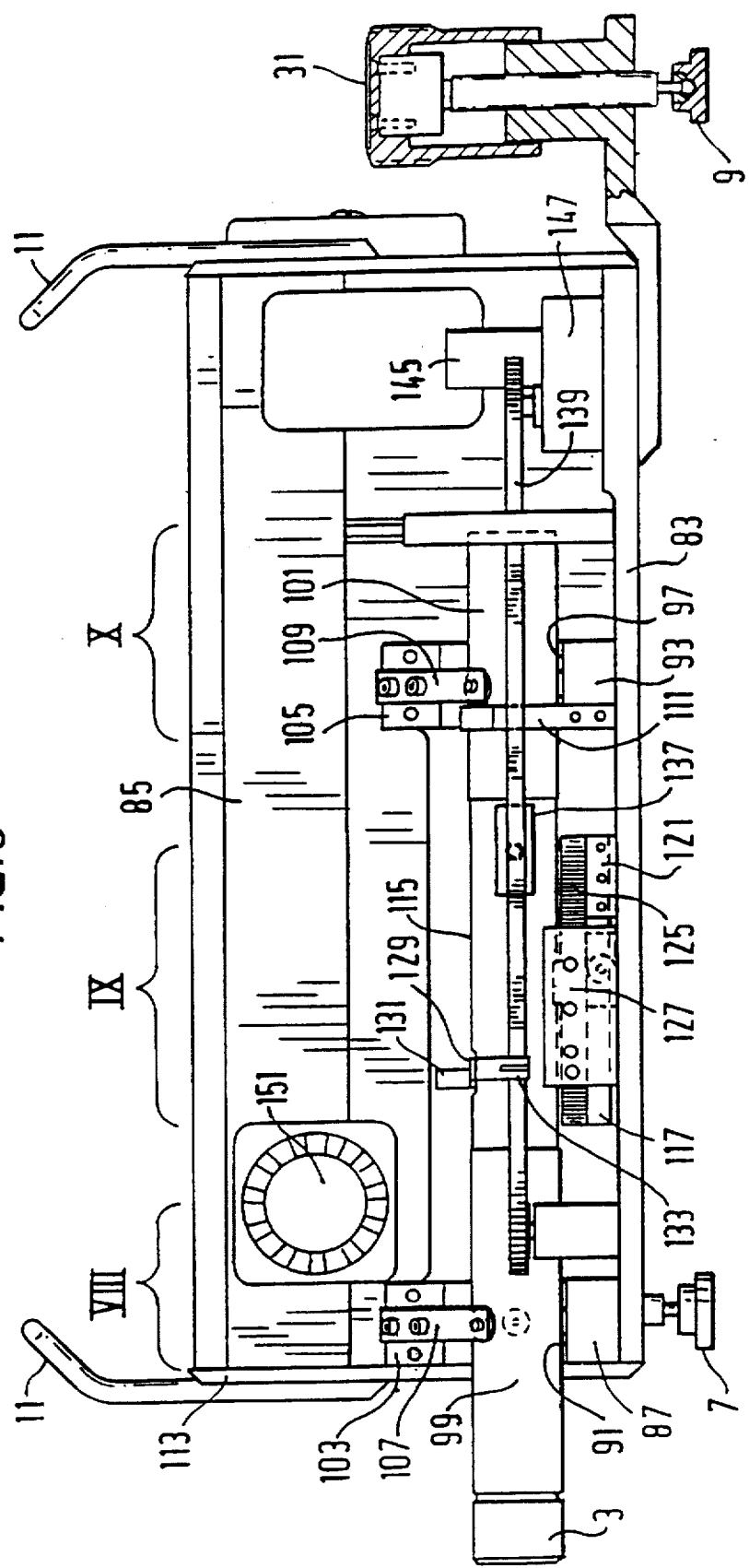
FIG. 6 is an internal view from the front side.
Figure 7:
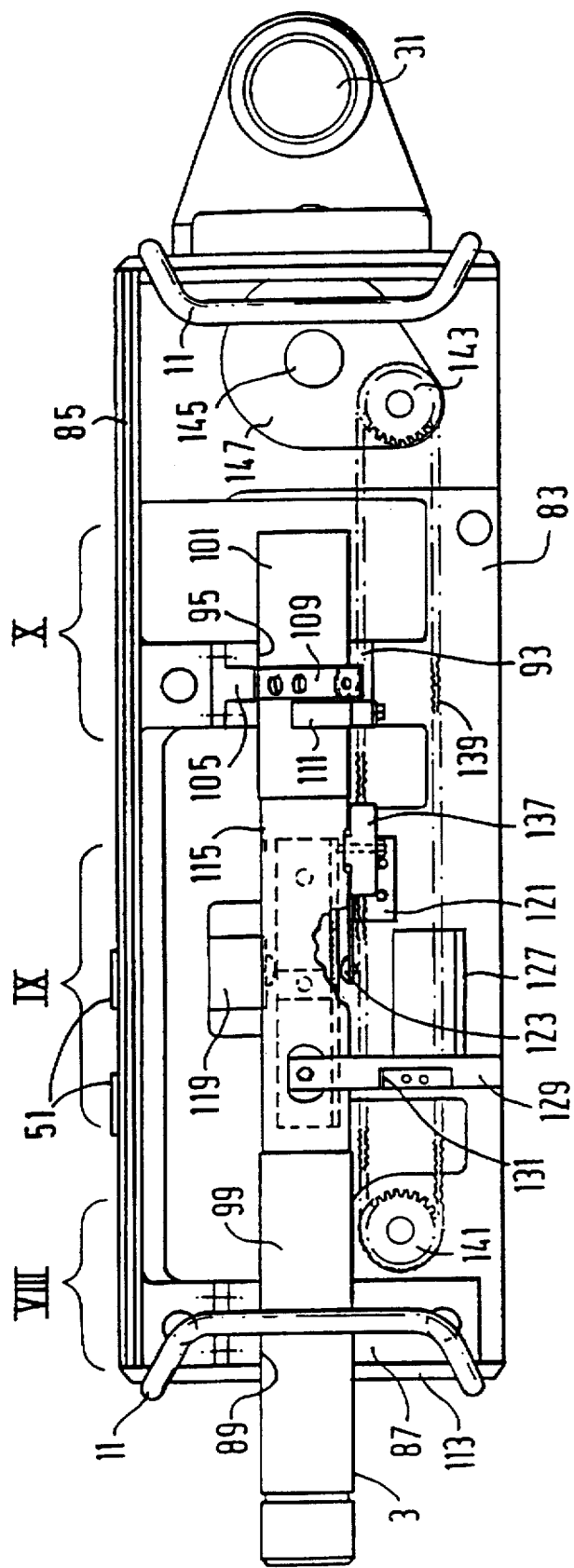
FIG. 7 is an internal view from above.
Figure 8:
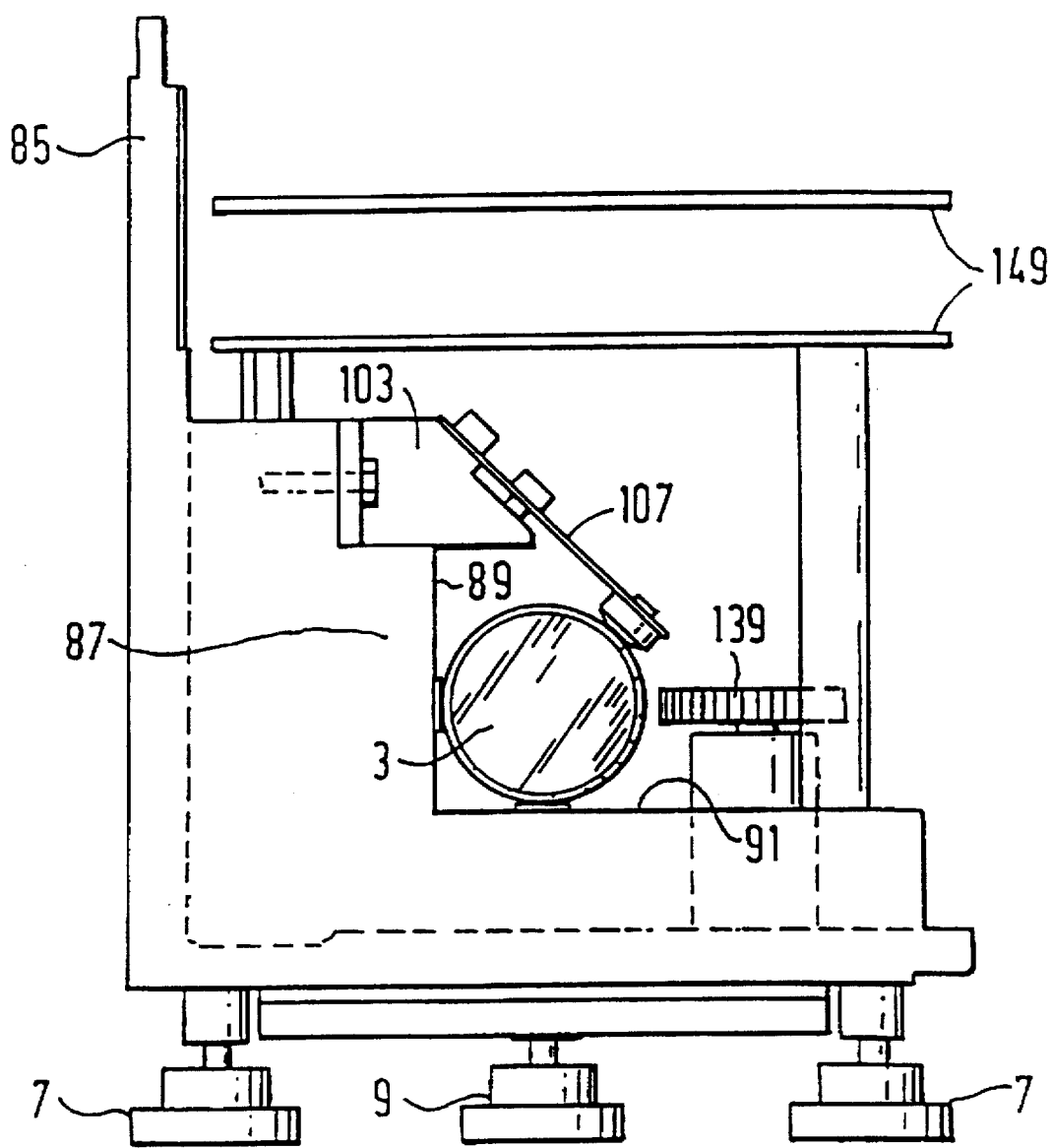
FIG. 8 is an internal view from the gauging end of components in region VIII of FIGS. 6 and 7.
Figure 9:
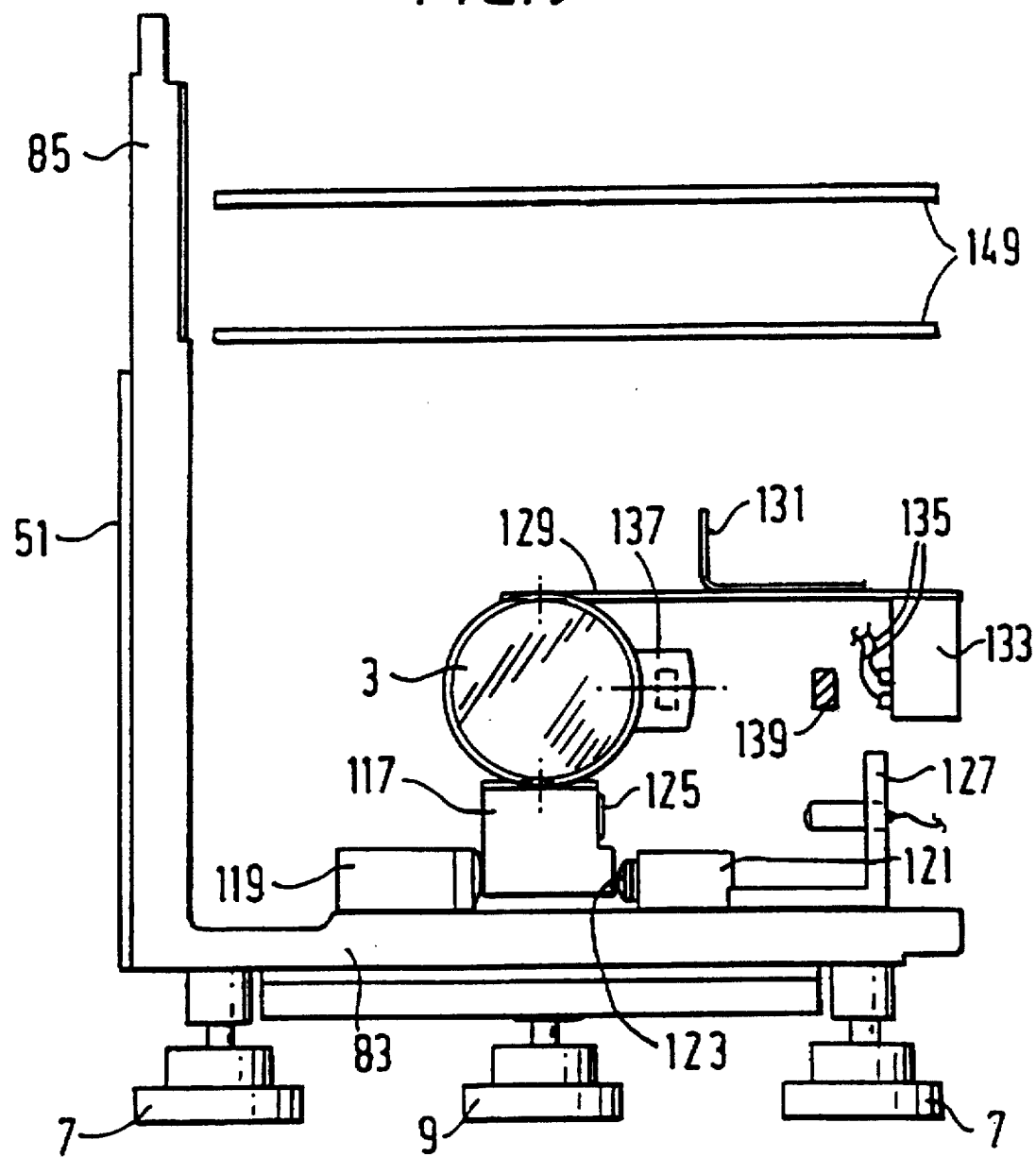
FIG. 9 is an internal view from the gauging end of components in region IX of FIGS. 6 and 7.
Figure 10:
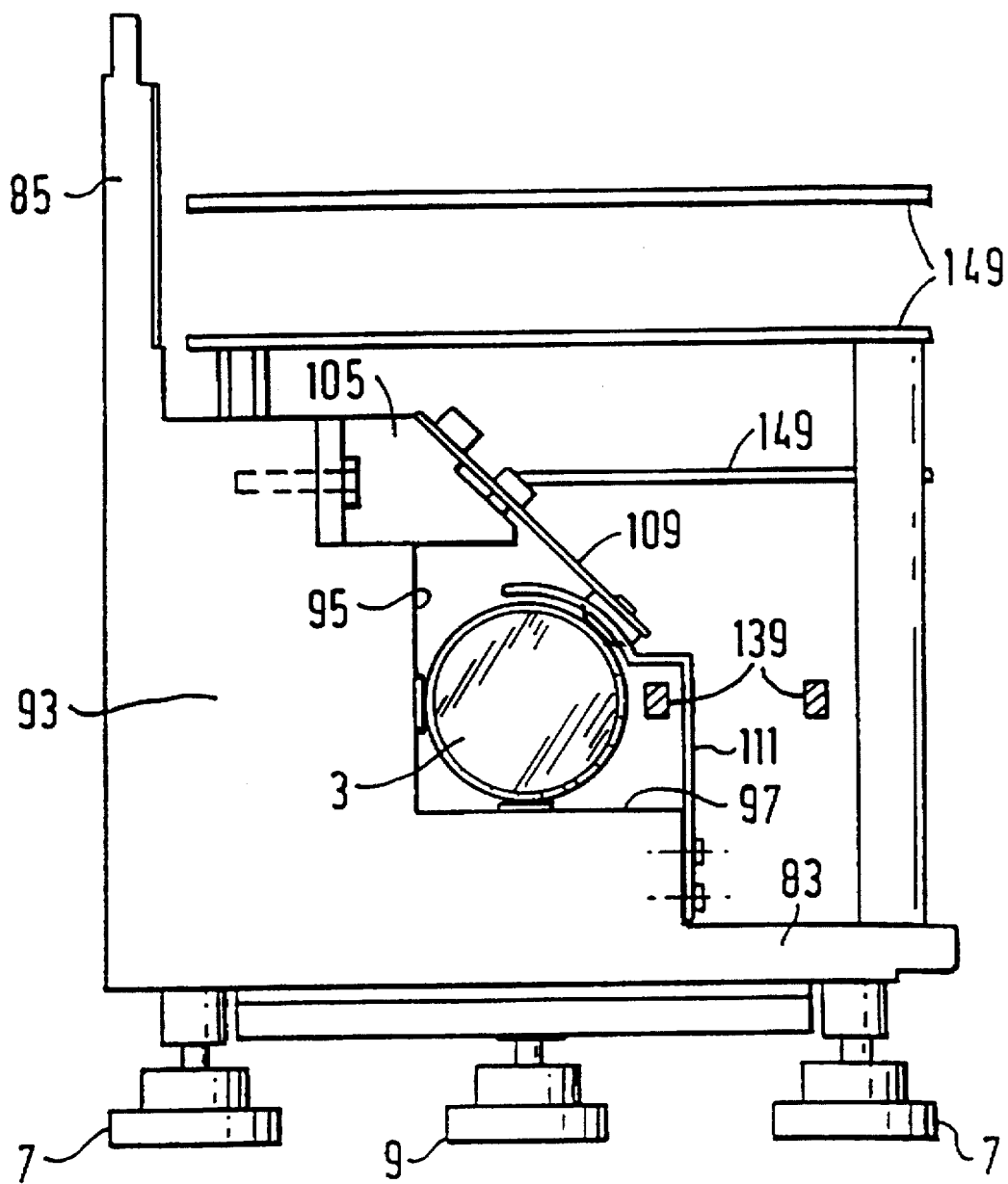
FIG. 10 is an internal view from the gauging end of components in region X in FIGS. 6 and 7.

FIGS. 6 to 10 illustrate the principal parts of the construction of the metrological instrument inside the main housing 1. For clarity of illustration, some parts are shown only in some of these Figures. FIG. 6 is an internal view from the front side. FIG. 7 is an internal view from above. FIG. 8 is an internal view from the gauging end, principally of components in the region VIII in FIGS. 6 and 7. FIG. 9 is an internal view from the gauging end, principally of components in the region IX in FIGS. 6 and 7. FIG. 10 is an internal view from the gauging end principally of components in the region X in FIGS. 6 and 7.

An aluminium alloy casting provides a floor 83 and a rear wall 85 for the main housing 1, as can be seen most clearly in FIG. 9. This is supported by the feet 7, 9, and provides the base from which all other parts of the metrological instrument are supported directly or indirectly. The front side surface and top surface of the main housing 1, as seen in FIGS. 1 and 2, is provided by a cover which is fastened to the aluminium alloy casting, and which is not shown in FIGS. 6 to 10.

At the gauging end of the main housing 1, a lug 87, which is part of the main aluminium alloy casting, extends from the rear wall 85 towards the front side, and is shaped to provide a vertical surface 89 adjacent the rear side of the arm 3 and then to pass under the arm 3 to provide a horizontal surface 91 beneath it. As can be seen from FIGS. 7 and 8, the lug 87 continues from beneath the arm 3 almost all of the way to the front side of the main housing 1. About two thirds of the way towards the non-gauging end of the main housing 1, a similar lug 93, also part of the aluminium alloy casting, extends from the rear wall 85 to provide a vertical surface 95 adjacent to the rear side of the arm 3 and a horizontal surface 97 beneath the arm 3. As can be seen from FIG. 10, the lug 93 does not extend to the front side of the main housing 1, but terminates slightly to the front of the arm 3. The arm 3 rests against the vertical surfaces 89, 95 and the horizontal surfaces 91, 97 through small pads of DELRIN (trade mark) and these surfaces define the position of the arm 3 relative to the aluminium alloy casting and the remainder of the main housing 1. The portions 99, 101 of the arm 3 which rest against the surfaces 89, 91, 95, 97 have ground and polished surfaces to ensure high precision location and smooth movement of the arm 3.

Each of the lugs 87, 93 supports a block 103, 105 at the top of its vertical surface 89, 95. Secured to each block 103, 105 is a leaf spring 107, 109, which extends downwards and towards the front over the arm 3, and terminates with a pad which is pressed by the action of the leaf spring, 107, 109 against the arm 3. As can be seen from FIGS. 8 and 10, the action of the leaf springs 107, 109 is to press the arm 3 so as to locate it against the vertical surfaces 89, 95 and the horizontal surfaces 91, 97.

As can be seen from FIGS. 6, 7 and 10, a strong metal strip 111 is fastened to the front surface of the lug 93 towards the non-gauging end of the main housing 1. The strip 111 rises up to the level of the arm 3, then turns in towards it, and its free end follows closely the surface of the arm 3 over an upper front segment. The strip 111 does not contact the arm 3 during normal operation. However, if the housing 1 is inverted or is subject to a violent impact, the strip 111 captures the arm 3 and prevents it from moving away from the lug 93 even if the force of the leaf spring 109 is overcome. This restrains the arm 3 from moving sufficiently far to damage itself or other components.

At the gauging end of the main housing 1 the arm 3 passes through a hole in an end plate 113. The clearance between the arm 3 and the hole in the end plate 113 is small enough to restrain damaging movement of the arm 3 away from the lug 87 if it overcomes the force of the leaf spring 107, and accordingly there is no need to provide the lug 87 with a strip corresponding to the strip 111 on the lug 93.

Between the ground and polished parts 99, 101 of the arm 3, there is a reduced diameter part 115 to which various fittings are attached. This part has a reduced diameter so that the tappings and machinings on the arm 3 for attachment of the fittings do not interfere with the process of grinding and polishing the parts 99, 101.

As can be seen in FIGS. 6 and 9, a parallel sided flange 117 is fixed to the arm 3 so as to extend below it. The lower half of the flange 117 is polished on each side to provide a smooth precision surface. On the rear side of the flange 117, the polished surface abuts against a block 119 provided on the floor 83, via a DELRIN (trade mark) pad. Adjacent the front polished surface of the flange 117 a further block 121 on the floor 83 carries a leaf spring which extends along side the flange 117, and terminates in a pad 123 which presses against the flange 117 through the action of the leaf spring. In this way, the flange 117 is pressed against the abutment block 119, thereby resisting rotation of the arm 3 about its axis.

A reflection type optical grating 125 is fixed to the upper part of the front side of the flange 117, and a detector unit 127 is mounted on the floor 83 facing the grating 125. Since the flange 117 is fixed to the arm 3, it moves with the arm 3 as the arm 3 is extended from and retracted into the main housing 1. Therefore movement of the arm 3 causes the grating 125 to move past the detector unit 127. The detector unit 127 carries a light source for illuminating the grating 125 and a photoelectric detector for detecting movement of grating lines past it. In this manner, movement of the arm is monitored using the grating 125 in a known manner. The detection signals from the detector unit 127 are provided to the electrical circuitry of the instrument, and enable it to monitor the position of the arm 3. In normal measurement operation, the electrical circuitry uses the signal from the detector unit 127 to store a value representing the output of the inductor coil 77 of the stylus transducer at every 0.5 μm in the movement of the arm 3.

A horizontal marker strip 129 is fixed to the top of the arm 3 and extends towards the front side of the main housing 1. This moves within the main housing 1 with movement of the arm 3. A bracket 131 is fixed to extend upwardly from the top of the marker strip 129. Optical detectors (not shown) can be mounted in the main housing 1 to detect the bracket 131 as it passes, to enable detection of the absolute position of the arm 3. An optical detector is mounted at a position for the bracket 131 representing the fully extended position of the arm 3, and another optical detector is mounted at the position of the bracket 131 representing the fully retracted position of the arm 3, and these enable the electrical circuitry to detect the fully extended and fully retracted state of the arm 3 and terminate further movement of the arm 3 automatically if these positions are reached. This provides a safety mechanism to prevent the arm 3 from overrunning its end positions.

At the end of the marker strip 129 at the front side of the main housing 1, a housing 133 extends downwardly from it. This housing is positioned immediately behind a slot in the front cover of the main housing 1 which provides the scale 35. A light emitting diode is mounted in the housing 133, powered by trailing leads 135, to provide the illuminated spot 33 for the scale 35. As the arm 3 moves into and out of the main housing 1, the marker strip 129 carries the LED in the housing 133 along the slot providing the scale 35, and accordingly the illuminated spot 33 moves to provide operation of the scale.

A block 137 is fastened to the side of the arm 3 and clamps the ends of a flexible ladder belt 139. The ladder belt 139 extends between a non-driven wheel 141 near the gauging end of the main housing and a driven wheel 143 near the non-gauging end of the main housing 1. The driven wheel 143 is driven by a variable speed electric motor 145 via a reduction gearing 147 which reduces the motor speed by a factor of about 300:1. In this way, the motor 145 is used to drive the arm 3 into and out of the main housing 1.

There is no shaft encoder or other means mounted on the motor 145 to provide an output signal representing the motor position. Instead, the control circuitry for the metrological instrument uses the signals from the detector unit 127 representing movement of the grating 125 to control the motor 145. The signals from the detector unit 127 are used to provide sine and cosine waves-having a period representing 4 µm movement of the arm 3, and these are provided to a conventional pulse generator chip which detects zero-crossings of these waves to generate four pulses in each 4 µm period, or one pulse per micrometer movement of the arm 3. These pulses are provided to a conventional proportional integral differential (PID) motor control chip for control of the variable speed electric motor 145 in accordance with control signals representing the desired movement of the arm 3. Owing to flexibility in the ladder belt 139 and some inevitable looseness in the gearing 147, the position of the arm 3 does not represent precisely the position of the motor 145. However, it is found in practice that this system enables sufficiently accurate control of the position to which the motor 145 moves the arm 3 and the speed at which movement takes place.

The electrical circuitry for controlling the operation of the instrument, operating the control panel 37, and receiving, processing and outputting data from the inductor coil 77 and the detector unit 127 for the grating 125, are mounted on circuit boards 149 fitted in the upper part of the main housing 1. Additionally, a fan 151 is mounted over the grille 39 in the rear wall 85 for cooling the components in the main housing 1.

Gauging Unit Circuitry

Figure 11:
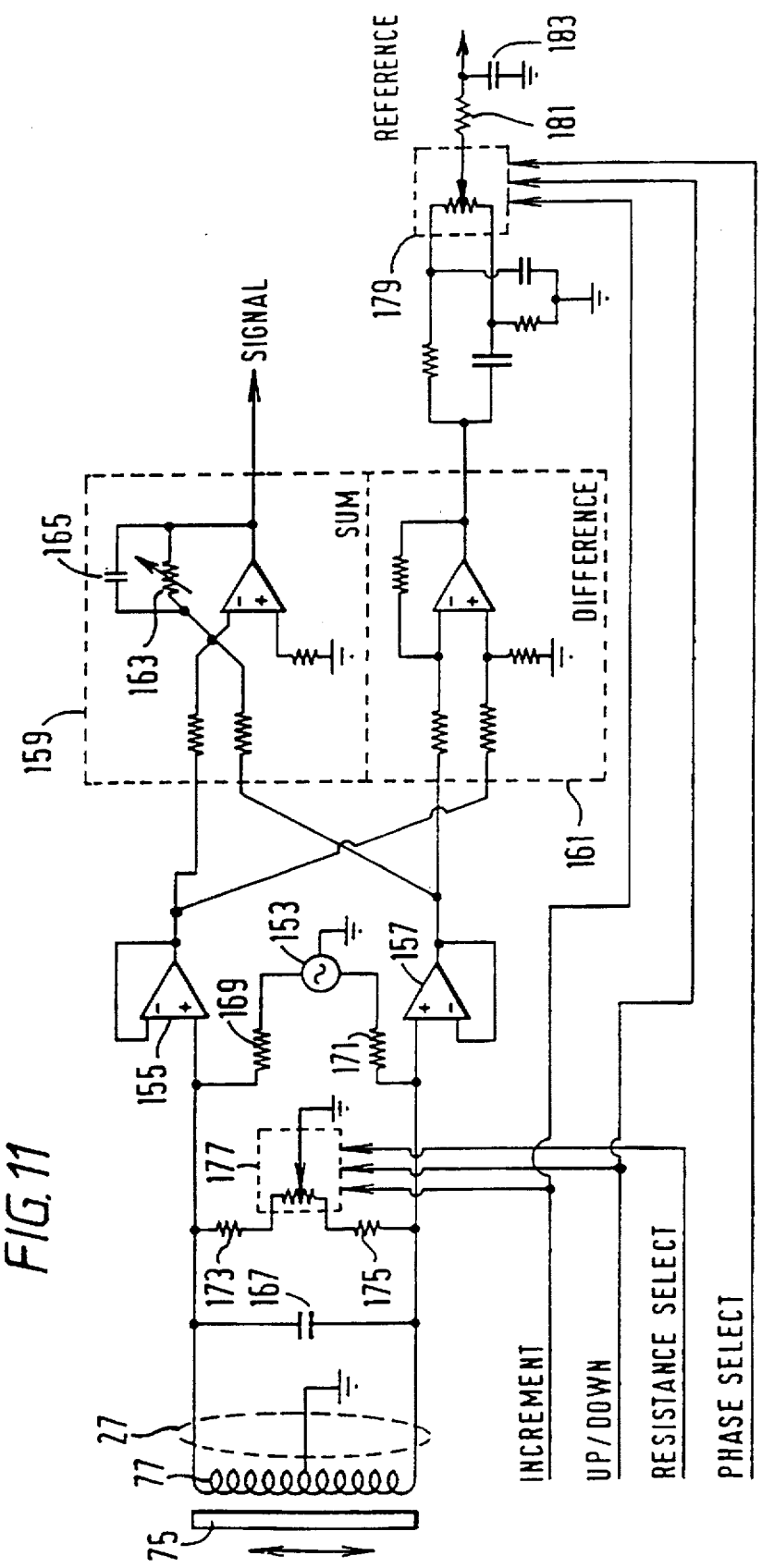
FIG. 11 is a diagram of the gauging circuit.

FIG. 11 shows the gauging circuit which uses the inductor coil 77 of the stylus transducer to obtain a signal representing the position of the stylus tip 23. As shown in FIG. 11, the two end taps and the centre tap of the inductor coil 77 in the gauge housing 19 are connected to the remainder of the gauging circuit through the flexible trailing lead 27. The remainder of the gauging circuit is provided on one of the circuit boards 149 inside the main housing 1.

An oscillator 153 provides a 10 kHz sine wave at 2 volts rms. The centre tap of the oscillator 153 is grounded so that its two outputs to the respective ends of the inductor coil 77 have equal and opposite levels.

The centre tap of the inductor coil 77 is also grounded, as is the centre point of a resistive network across the ends of the inductor coil 77, so that nominally the two ends of the coil have oscillating amplitudes exactly in antiphase (i.e. the voltage at one end of the inductor coil 77 is 180 degrees out of phase with the voltage at the other end of the inductor coil 77). At a mid position of the stylus tip 23 the core 75 is coupled equally to the halves of the inductor coil 77 either side of its centre tap. Accordingly, the oscillating voltages at the two ends of the inductor coil 77 will have the same amplitude. As the stylus tip 23 moves, the core 75 moves correspondingly so that it becomes coupled more closely to one half of the inductor coil 77 than the other. The relative amplitudes of the oscillating voltages at the two ends of the inductor coil 77 change accordingly.

The voltages at the ends of the inductor coil 77 are buffered by respective unity gain operational amplifier buffers 155, 157. The outputs from the buffers 155, 157 are added together in a conventional summing circuit 159 based on an operational amplifier. Since the two voltages are in antiphase, they will tend to cancel out, and if they have the same amplitude their sum will be substantially zero. If the voltages at the respective ends of the inductor coil 77 have different amplitudes, their sum will be an oscillating voltage having the phase of the greater of the input voltages and having an amplitude equal to the difference between the amplitudes of the input voltages. Accordingly, the summing circuit 159 provides an output signal having an amplitude which varies with the position of the core 75, and a phase which indicates the direction in which the core 75 has moved from its centre position.

The outputs of the buffers 155, 157 are also input to a conventional difference circuit 161 based on an operational amplifier. Since the inputs to the difference circuit 161 are in antiphase, the output will be an oscillating signal having the phase of the non-inverted input and an amplitude representing the sum of the amplitudes of the two input signals. As the core 75 moves relative to the inductor coil 77, the output from one buffer 155 increases in amplitude while the output from the other buffer 157 reduces in amplitude. Consequently, the signal output from the difference circuit 161 has an essentially constant amplitude and phase regardless of the position of the stylus tip 23. This provides a reference against which the amplitude and phase of the signal output from the summing circuit 159 may be compared. Since the signal output from the summing circuit 159 and the reference output from the difference circuit 161 are both derived from the oscillating voltages at both ends of the inductor coil 77, the comparison between them has good immunity to slight variations in the phase and amplitude of the output of the oscillator 153.

Variation of the resistor 163 in the feedback path of the summing circuit 159 permits trimming of the gain of the summing circuit 159. A capacitor 165 in parallel with the resistor 163 attenuates high frequency noise.

A capacitor 167 is connected across the ends of the inductor coil 77, and the value of the capacitor 167 is chosen relative to the inductance of the inductor coil 77 so as to form with it a tuned circuit with a resonant frequency at 10 kHz. Resistors 169, 171 between the outputs of the oscillator 153 and the remainder of the circuit permit slight phase and voltage differences between the ends of the inductor coil 77 and the outputs of the oscillator 153 and prevent the oscillator 153 from driving the tuned circuit capacitor 167 directly. The tuned circuit formed by the capacitor 167 and the inductor coil 77 tends to reject any spurious signals at frequencies other than the oscillator frequency, thereby improving the signal-to-noise ratio and reducing the effect of third harmonic distortion to which the described type of linear variable differential transducer (LVDT) is prone at large movements of the core 75 relative to the coil 77.

Slight difference in the electrical resistance of the two halves of the inductor coil 77 tends to introduce a slight quadrature component into the oscillating voltages at the two ends of the inductor coil 77, so that they are not precisely in antiphase. This results in a slight amplitude and phase error in the signal output from the summing circuit 159. For example, if the stylus 23 is in its central "home" position, so that the core 75 is coupled equally to the two halves of the inductor coil 77, the outputs of the buffers 155, 157 have equal amplitudes and should cancel in the summing circuit 159. However, if they are slightly shifted from exact antiphase, the sum of the inputs will be an oscillating signal in quadrature (90 degrees phase shifted). The amplitude of this residual signal will depend on both the amplitude of the input signals and the extent to which they are shifted from antiphase, since it is the vector sum of the two signals.

In order to eliminate this quadrature error, a resistor network is connected across the ends of the inductor coil 77. The resistor network comprises two 18 kilohm resistors 173, 175 joined by an electrically adjustable potentiometer 177. This is a commercially available device such as the XICOR chip X9C103, equivalent to a 10 kilohm potentiometer, the "wiper" position of which can be varied by clock signals on an "increment" line while the device is selected by a "select" line. An up/down control line controls the direction in which the effective wiper position of the potentiometer is altered. As shown in FIG. 11, the wiper of the potentiometer 177 is connected to earth, and the changes in its position compensate for the imbalance between the resistances of the two halves of the inductor coil 77, so as to bring the oscillating signals at the two ends of the inductor coil 77 correctly into antiphase. By appropriate control of the signals input to the electrically adjustable potentiometer 177, its effective wiper position can be halted when the desired position is reached, and that position can be stored in a non-volatile manner when the "select" signal is removed, so that the adjustment setting is retained even when power is removed from the circuit.

As the core 75 moves relative to the inductor coil 77, the oscillating voltages at the two ends of the coil 77 tend to change phase slightly as well as change amplitude. Accordingly, even if the voltages are exactly in antiphase when the core 75 is in its central position, the voltages cease to be in exact antiphase at other positions of the core. This causes a slight phase shift in the signal output from the summing circuit 159 and in the reference output from the difference circuit 161. This results in a slight phase difference between the signal and the reference. In practice, this phase difference is substantially constant over the working range of the transducer, and a conventional phase shifting network is provided on the output of the difference circuit 161 to bring the reference into phase with the signal output from the summing circuit 159.

The phase shifted reference is taken from the wiper of an electrically adjustable potentiometer 179 in the phase shift network, and the output phase can be varied by varying the effective wiper position of the electrically adjustable potentiometer 179. This electrically adjustable potentiometer 179 may also be a XICOR chip X9C103. This can be altered by control signals in the same manner as described above with reference to the electrically adjustable potentiometer 177.

In order to eliminate spike noise which may be introduced by the electrically adjustable potentiometer 179, the phase shifted reference is filtered by a resistor 181 and a capacitor 183. This produces a slight further phase shift, but this is substantially equivalent to the phase shift created by the capacitor 165 in the signal output from the summing circuit 159, and additionally this phase shift will be taken into account when adjusting the potentiometer 179.

The use of the electrically adjustable potentiometers 177, 179 enables the adjustment operations to be carried out by the control circuitry, as is described below, and avoids the need for an operator to make manual adjustments if it is desired to remove these errors.

Figure 12:
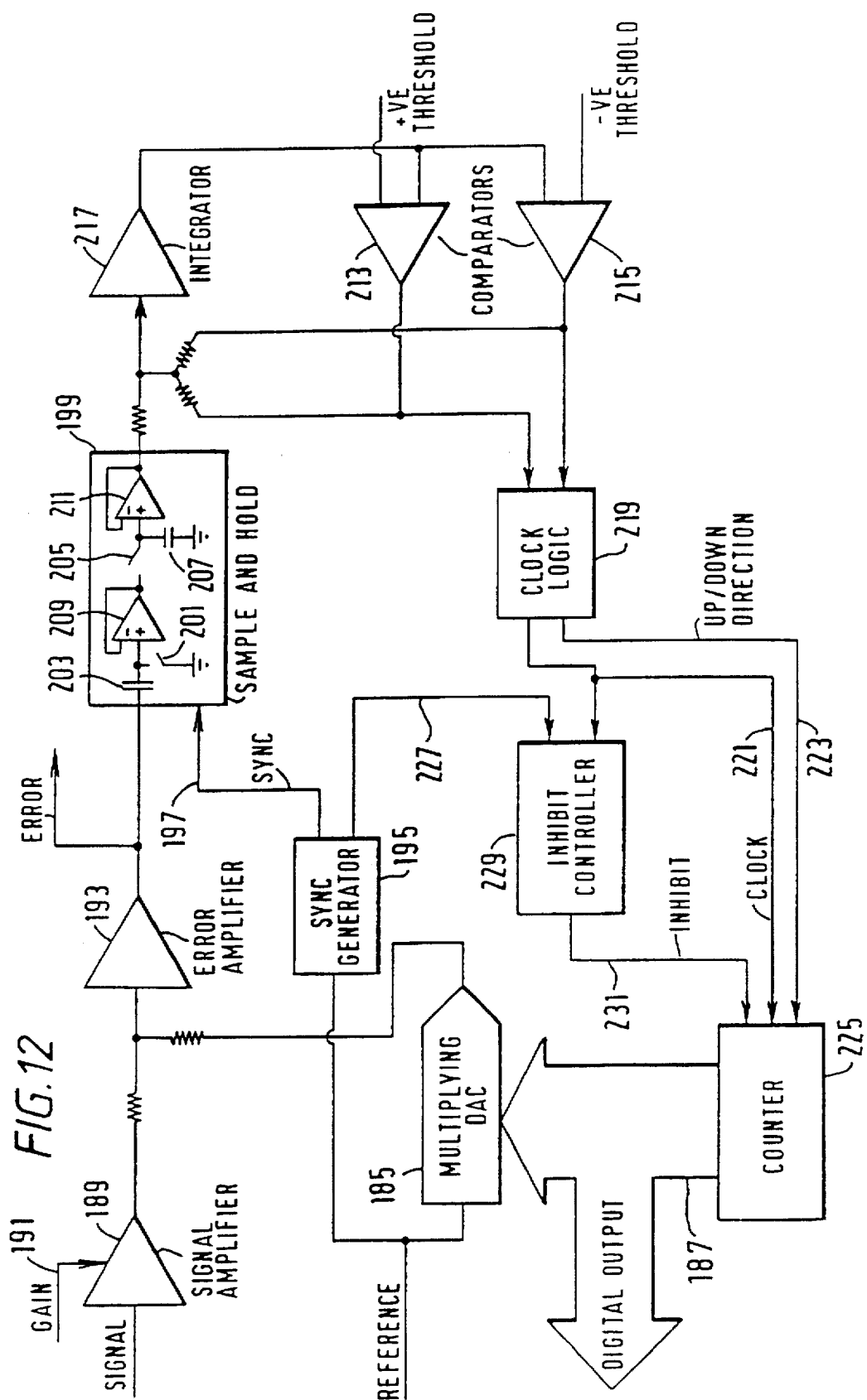
FIG. 12 is a diagram of the converter circuit for converting the output of the gauging circuit to a digital value.

FIG. 12 illustrates a convertor circuit by which the signal and the reference from FIG. 11 are used to obtain a digital binary number representing the position of the core 75 relative to the inductor coil 77 and therefore representing the position of the stylus tip 23.

The concept underlying the convertor circuit of FIG. 12 is that the oscillating analogue reference from the difference circuit 161 will be multiplied by a positive or negative number to produce a signal having the same amplitude but opposite phase to the signal output from the summing circuit 159. These signals are combined and should cancel out. Any resulting signal represents an error, which controls the counter which generates the number by which the reference is multiplied, in a negative feedback loop. In this way, the digital number by which the reference is multiplied is adjusted to the magnitude of the signal output from the summing circuit 159, and this digital number represents the output of the convertor circuit of FIG. 12.

The reference output from the difference circuit 161, after phase adjustment, is input to a multiplying digital-to-analogue convertor 185. This multiplies the reference in accordance with a 16-bit digital input 187. The multiplying DAC 185 is set up as a bipolar multiplier so that it multiplies the oscillating reference by a value between +1 and −1 with negative values having the effect of reversing the phase of the output of the multiplying DAC 185 relative to the received reference. The value zero (0000 hexadecimal) for the digital number 187 corresponds to the maximum amplitude output from the multiplying DAC 185 with phase reversal compared with the input reference (i.e. multiplication by minus 1). The value 3276B (8000 hexadecimal) for the digital number 187 represents multiplication by zero. The value 65535 (FFFF hexadecimal) represents the maximum amplitude output without phase reversal.

The signal output from the summing circuit 159 is amplified by a signal amplifier 189, the gain of which can be selected by a gain control signal 191. The output from the signal amplifier 189 and the output from the multiplying DAC 185 are combined at the input of an error amplifier 193. The error amplifier 193 is an inverting summing amplifier based on an operational amplifier. It outputs an inverted amplified version of the sum of the output from the signal amplifier 189 and the output from the multiplying DAC 185. Provided that any phase errors in the input signal and reference have been removed as discussed above, a suitable value for the digital number 187 should result in an output from the multiplying DAC 185 having the same amplitude as the output from the signal amplifier 189 but in reverse phase. In this state, the inputs to the error amplifier 193 cancel each other out and there is no output from the error amplifier 193.

If there is a phase error so that the output of the signal amplifier 189 and the output of the multiplying DAC 185 are not precisely in antiphase, the input to the error amplifier 193 cannot be reduced to zero amplitude. Accordingly, the error signal output by the error amplifier 193 is susceptible to phase errors, and is used in the error correction circuitry which operates the electrically adjustable potentiometers 177, 179. If the phase errors have been removed, the value of any error signal output by the error amplifier 193 represents an error in the value of the digital number 187 input to the multiplying DAC 185.

A synchronisation generator 195 outputs brief sychronisation pulses 197 to a sample-and-hold circuit 199 which receives the error signal output by the error amplifier 193. The synchronisation generator 195 responds to the reference, and the synchronisation signals 197 are brief pulses in phase with both the positive peaks and the negative peaks of the alternating reference voltage. Accordingly, the synchronisation pulses are in phase with both the positive peaks and the negative peaks of the oscillating error signal output by the error amplifier 193.

At the time of the positive peak of the reference voltage, a switch 201 is closed briefly to clamp the output side of an input capacitor 203 to ground while the input side of the capacitor 203 receives one of the peaks of the oscillating error signal. The switch 201 immediately opens again. At the time of the following negative peak of the reference voltage, the error at the input side of the capacitor 203 will have changed to its opposite peak, so that the output side of the capacitor 203 will vary from ground by the peak-to-peak voltage of the oscillating error signal. At this instant a sampling switch 205 is closed briefly to store the value on the output side of the input capacitor 203 on a sampling capacitor 207. A unity gain buffer 209 is provided between the input capacitor 203 and the sampling switch 205, to avoid draining the input capacitor 203 during sampling.

This arrangement for the sample-and-hold circuit 199 enables storage of the full peak-to-peak value of the oscillating error signal, and also eliminates any unwanted DC level which might be superimposed on the oscillating error signal. The voltage stored on the sampling capacitor 207 will be greater than ground or less than ground depending on whether the phase of the oscillating error signal is the same as that of the reference voltage or the reverse.

The sampled value stored on the sampling capacitor 207 is buffered in a further unity gain buffer 211, and is combined with the outputs of two comparators 213, 215 at the input to an integrator 217. The comparator 213 compares the output of the integrator 217 with a positive threshold value and the comparator 215 compares the output of the integrator 217 with a negative threshold value. Provided that the output of the integrator 217 is between the two threshold values, both comparators 213, 215 output a signal at zero volts. In this state, the input to the integrator 217 depends on the value of the voltage stored on the sampling capacitor 207, and the integrator output will steadily rise or fall as it integrates the resulting value at its input. The greater the difference between the voltage on the sampling capacitor 207 and zero volts, the greater the rate at which the output of the integrator 217 changes voltage.

In due course, the output voltage of the integrator 217 will become sufficiently positive or negative that the appropriate one of the comparators 213, 215 will change state. The comparator 213, 215 then applies a large voltage output having the opposite sign from the input to the integrator 217 which has driven it to trigger that comparator. Consequently, the voltage at the output of the integrator 217 rapidly changes in the reverse direction, back towards zero volts. The comparators 213, 215 are arranged to have hysteresis, so that they are triggered by an output voltage from the integrator 217 of plus or minus 25 mV, but do not turn off until the voltage output from the integrator 217 ceases to exceed plus or minus 15 mV. Once the integrator output 217 has returned to plus or minus 15 mV, the output of the relevant comparator 213, 215 returns to zero volts, and the integrator returns to being controlled by the voltage stored on the sampling capacitor 207.

In this way, the output of the integrator 217 slowly changes from plus or minus 15 mV to plus or minus 25 mV under the influence of the voltage stored on the sampling capacitor 207, and then is rapidly reset by one of the comparators 213, 217. The frequency with which the integrator 217 is reset depends on the magnitude of the voltage stored on the sampling capacitor 207, and the identity of the comparator 213, 215 which resets the integrator 217 depends on whether the voltage stored on the sampling capacitor 207 is positive or negative. A clock logic circuit 219 receives the output pulses from the comparators 213, 215, and generates a clock output signal 221 in response to a reset pulse (non-zero output) from either of the comparators 213, 215. Accordingly, the frequency of the clock signal 221 depends on the magnitude of the voltage stored on the sampling capacitor 207. The clock logic 219 also outputs an up/down direction signal 223 in accordance with which of the comparators 213,215 is providing the reset pulses which generate the clock signal 221.

A 16-bit digital counter 225 counts in response to the clock signals 221, under direction control from the up/down signal 223. The output of the 16 bit counter 225 is the digital number 187 input to the multiplying DAC 185, and is also the digital output from the convertor circuit of FIG. 12. In this way, the clock signals 221 change the value of the digital number 187, thereby changing the output of the multiplying DAC 185 and the error signal which is sampled and held on the sampling capacitor 207. When the output signal from the multiplying DAC 185 becomes the same as the output signal from the signal amplifier 189, the error voltage stored on the sampling capacitor 207 becomes zero volts. The output of the integrator 217 stops changing and accordingly there are no further clock signals 221 provided from the clock logic 219 to the counter 225.

In this way, the convertor circuit of FIG. 12 controls the value in the counter 225 so as to track the input signal received from the summing circuit 159.

As the value in the counter 225 changes in response to a clock pulse 221, there is a possibility of momentary "glitches" during which a spurious value is output as the digital number 187. In order to prevent such spurious values from being captured on the sampling capacitor 207, the synchronisation generator 195 outputs warning signals 227 to an inhibit controller 229. Each warning signal starts between 6 μs and 9 μs before the beginning of each sychronisation pulse provided to the sample-and-hold circuit 199, and lasts at least until the end of the synchronisation pulse. The clock signals 221 from the clock logic 219 are also input to the inhibit controller 229, and if a clock signal 221 is received while a warning signal 227 is present, the inhibit controller 229 outputs an inhibit signal 231 to the counter 225. The counter 225 responds to inhibit signals 231 more quickly than it responds to clock signals 221, so that the inhibit signal 231 prevents the counter 225 from counting in response to the clock signal 221 which triggered generation of the inhibit signal 231.

In this manner the counter 225 is prevented from counting just before either the clamp switch 201 or the sampling switch 205 of the sample-and-hold circuit 199 closes, so that the counter 225 settles to its correct value before the relevant switch 201, 205 closes. Then the counter 255 is held at that value for as long as the switch 201 or 205 is closed. Accordingly, instantaneous "glitch" values output by the counter 225 do not upset the voltage stored on the sampling capacitor 207.

Figure 13:
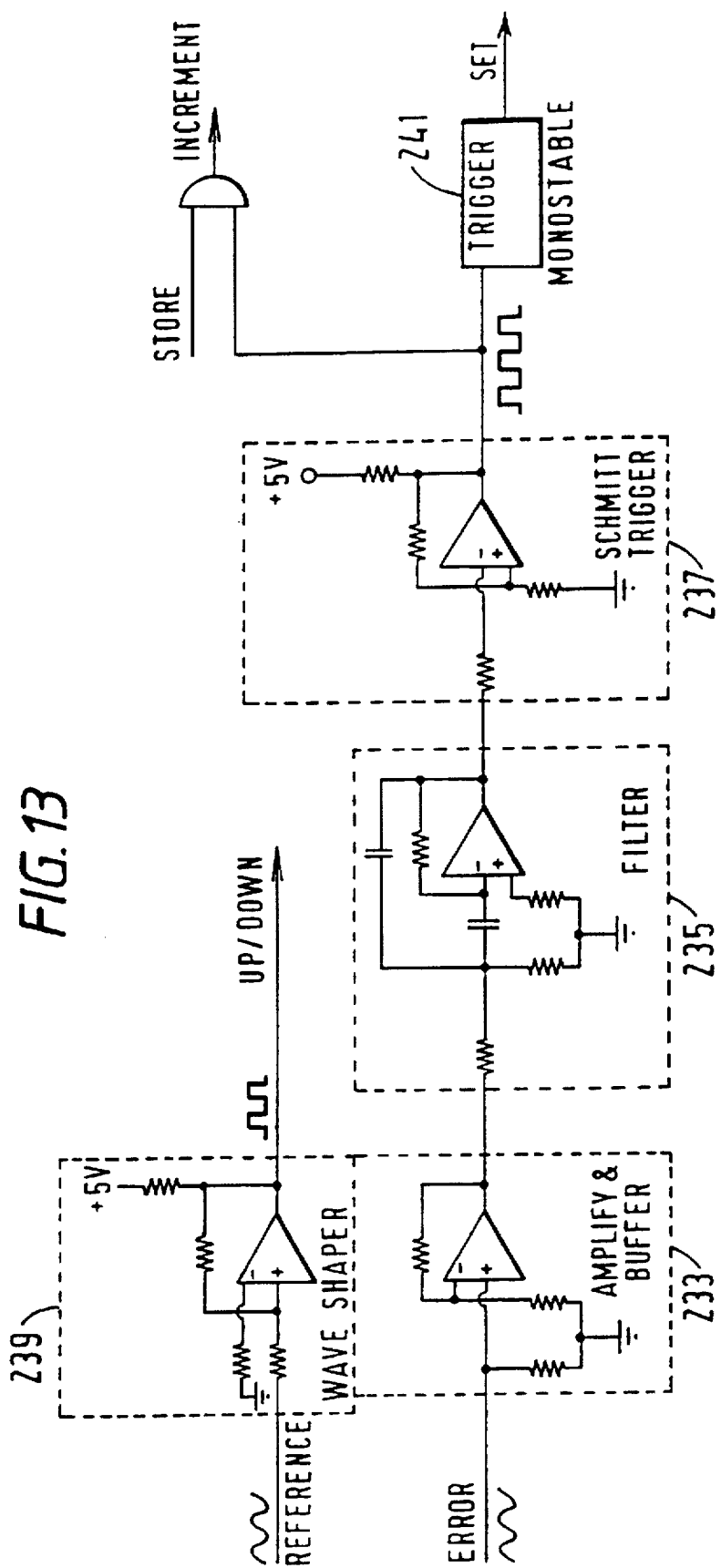
FIG. 13 is a diagram of an error adjustment circuit for providing control signals to adjustable components in the gauging circuit.

FIG. 13 shows an error adjustment circuit which is used to drive the electrically adjustable potentiometers 177, 179 in the gauging circuit of FIG. 11.

As can be seen from FIG. 13 the "increment" pulses used to drive the electrically adjustable potentiometers 177, 179 are derived from the error signal output by the error amplifier 193 of FIG. 12, and the up/down control signal for the direction in which the effective wiper position of the electrically adjustable potentiometers 177, 179 are to be altered is derived from the reference output from the gauging circuit of FIG. 11 and input to the converter circuit of FIG. 12.

If there is a resistive imbalance in the inductor coil 77 or a phase offset between the signal output by the summing circuit 159 and the reference output by the difference circuit 161, the output of the multiplying digital-to-analogue converter 185 will not be exactly in anti-phase with the output from the signal amplifier 189, and accordingly the amplitude of the input to the error amplifier 193 can never be reduced to zero. In this state, the digital number 187 will be driven to a value in which the output from the multiplying DAC 185 cancels the in-phase component in the output of signal amplifier 189, and the error signal is in quadrature with the reference voltage. Under these circumstances, the timing of the synchronisation pulses 197 will cause the sample-and-hold circuit 199 to operate at the instants when the oscillating error signal passes through zero, so that zero volts is stored in the sampling capacitor 207 and the value of the digital number 187 is stable.

If both errors are present in the output of the gauging circuit of FIG. 11, they will both contribute to the magnitude of the error signal output by the error amplifier 193, and the two sources of error are not easily separated. It is not possible to compensate for both errors by adjusting the phase of the reference voltage using the electrically adjustable potentiometer 179, because the quadrature component created by resistive imbalance in the coil 77 shifts the phase of the signal output from the summing circuit 159 by an amount which varies with the amplitude of the signal output from the summing circuit 159.

If the stylus tip 23 is in its home position, so that the core 75 is coupled equally to the two halves of the inductor coil 77, the amplitude of the signal output from the summing circuit 159 should be zero, and the output of the cancelling signal from the multiplying DAC 185 should also be zero. Under these circumstances, the error signal output by the error amplifier 193 comprises substantially entirely the quadrature error in the signal voltage caused by resistive imbalance in the inductor core 77, and the effect of any constant phase error between the reference voltage and the signal voltage is negligible. With the stylus tip 23 in this position, the error signal can be used to drive the electrically adjustable potentiometer 177 to compensate for the resistive imbalance in the inductor coil 77.

The error signal is input to an amplifying buffer 233, and then passes through a notch filter 235. The notch filter 235 permits the 10 kHz error signal to pass and filters out spurious signals at other frequencies. The filtered error signal is then input to a Schmitt trigger circuit 237, which changes the sine wave error signal to a train of rectangular pulses at 10 kHz. This pulse train provides the increment signal for the electrically adjustable potentiometer 177.

The oscillating reference voltage is input to a wave shaper circuit 239 to convert it to a train of rectangular pulses at 10 kHz on the up/down control line for the electrically adjustable potentiometer 177. Since the error signal output from the error amplifier 193 is in quadrature with the reference voltage, the increment pulses are in quadrature with the up/down control pulses. The increment pulses will lead or lag the up/down pulses depending on which half of the inductor coil 77 has the greater resistance, and accordingly the lead or lag between the two pulse trains indicates the direction in which the effective wiper position of the electrically adjustable potentiometer 177 should be moved.

The electrically adjustable potentiometer 177 is clocked to change its effective wiper position by the rising edge of each increment pulse, and the direction of movement is controlled by the value of the up/down signal at the time of the rising edge of the increment signal. If the increment signal leads the up/down signal, the up/down signal will always be low at the rising edge of the increment signal. If the increment signal lags the up/down signal, the up/down signal will always be high at the rising edge of the increment signal. In this way, the alternating up/down signal combines with the phase shift of the increment signal to provide automatic up/down control.

In order to ensure that the effective wiper position of the electrically adjustable potentiometer 177 is driven in the appropriate direction to compensate for the resistive imbalance in the inductor coil 77 rather than to exacerbate the error, one of the up/down signal and the increment signal can be inverted if necessary, either by providing a conventional inverter circuit or by changing the amplifying buffer 233 to become an inverting amplifier instead of a non-inverting amplifier.

Once the electrically adjustable potentiometer 177 has been adjusted to remove the quadrature error from the signal voltage output by the summing circuit 159, the stylus tip 23 can be moved to a position substantially away from its home position, so that the core 75 is more closely coupled to one half of the inductor coil 77 than the other and the signal voltage provided from the summing circuit 159 to the converter circuit of FIG. 12 has a substantial amplitude. The converter circuit of FIG. 12 responds by changing the value of the digital number 187 to cancel the output of the signal amplifier 189 so far as possible, and any remaining error signal output by the error amplifier 193 represents a phase shift between the oscillating signal voltage and the oscillating reference voltage away from exact anti-phase. Since the quadrature error has been removed from the signal voltage, this error is now due substantially entirely to the constant phase error between the signal and reference voltages, and can be cancelled by adjustment of the electrically adjustable potentiometer 179 in the phase shift network for the reference voltage.

The oscillating error voltage and the oscillating reference voltage are used to provide the increment pulse train and the up/down control pulse train for the electrically adjustable potentiometer 179 exactly as has already been described with reference to operation of the electrically adjustable potentiometer 177. The phase of the signal voltage output from the summing circuit 159 depends on which side of its home position the stylus tip 23 is moved to. Therefore this must be selected to ensure that the phase difference between the increment pulse train and the up/down control pulse train is in the correct direction to reduce the error.

During adjustment of either of the electrically adjustable potentiometers 177, 179 the amplitude of the error signal will reduce towards zero. The hysteresis in the action of the Schmitt trigger circuit 237 is set so that it ceases to change state when the filtered error signal input to it falls below a suitable threshold amplitude. This can conveniently be set at about 500 mV, and the magnitude of the corresponding error signal output by the error amplifier 193 can be controlled by selecting the amplification factor of the amplifying buffer 233. When the magnitude of the error signal falls below this threshold level, the output of the Schmitt trigger circuit 237 becomes constant and no further increment pulses are provided to the electrically adjustable potentiometers 177, 179.

The output of the Schmitt trigger circuit 237 is also provided to the trigger input of a re-triggerable monostable 241 having a pulse length greater than 100 μs (i.e. greater than the period of the increment pulses output by the Schmitt trigger circuit 237). Accordingly, as long as the Schmitt trigger circuit 237 is outputting the increment pulses, the monostable 241 is repeatedly re-triggered and its output remains in its semi-stable (triggered) state. However, when the error signal falls below its threshold amplitude and the Schmitt trigger 237 ceases to provide the increment pulses, the monostable 241 is no longer re-triggered and therefore its output changes state to its stable (untriggered) state. In this way, the output of the monostable 241 provides a "set" signal which indicates that the error signal output by the error amplifier 193 has been reduced to below its threshold amplitude.

In an automatic adjustment operation, the metrological instrument is set up with its stylus tip 23 resting on a sloping surface of a workpiece 25, arranged so that movement of the arm 3 will drive the stylus tip 23 from one side of its home position through its home position to the other side. The automatic adjustment operation begins with the stylus tip 23 at a position slightly away from its home position. The arm 3 is then driven to traverse the stylus tip 23 over the sloping surface of the workpiece 25 to move the stylus tip 23 towards its home position, and during this traverse movement a "resistance select" signal enables adjustment of the electrically adjustable potentiometer 177 for compensating for resistive imbalance. As the stylus tip 23 approaches its home position the digital number 187 will tend towards 32768 (8000 hexadecimal) and the operation of the electrically adjustable potentiometer 177 will tend to minimise the amplitude of the error signal. When the digital number 187 has the value 32768 (8000 hexadecimal) and the "set" signal output from the monostable 241 indicates that the amplitude of the error signal is below its threshold, the electrically adjustable potentiometer 177 is correctly adjusted. At this time, a "store" signal, which blocks further increment pulses (see FIG. 13) and the "resistance select" signal are used to prevent further adjustment of the electrically adjustable potentiometer 177 and cause it to store its adjustment position in a non-volatile manner.

The arm 3 is then moved to traverse the stylus tip 23 over the sloping surface of the workpiece 25, to bring the stylus tip 23 to a position substantially away from its "home position". Preferably the arm 3 is moved until the stylus tip is at about 75 percent of its gauge range. With the stylus tip 23 in this position, the electrically adjustable potentiometer 179 is enabled through a "phase select" signal, and it is adjusted until the "set" signal output by the monostable 241 indicates that the amplitude of the error signal output by the error amplifier 193 has again fallen below the threshold value. Further adjustment is then prevented and the adjustment value is stored in a non-volatile manner in the same manner as for the electrically adjustable potentiometer 177.

Because the signal voltage output from the summing circuit 159 reverses phase as the stylus tip 23 passes through the home position, the phase difference between the increment pulses and the up/down control pulses for control of the electrically adjustable potentiometer 179 is reversed for positions of the stylus tip 23 above the home position compared with positions below the home position. Accordingly, it is important to select which side of the home position of the stylus tip 23 is used to provide a signal during adjustment of the electrically adjustable potentiometer 179 to ensure that the potentiometer is adjusted to reduce the error signal rather than increase it.

After both of the electrically adjustable potentiometers 177, 179 have been adjusted, the automatic adjustment operation is completed. Once the metrological instrument has been set up with the stylus tip 23 contacting an appropriate adjustment workpiece 25, the operation can be carried out fully automatically under software control by generating the "resistance select", "phase select" and "store" signals and responding to the value of the digital number 187 and the "set" signal from the monostable 241.

Preferably, after the adjustment operation has been carried out the reference and error voltages are removed from the adjustment circuit of FIG. 13 and also the power supply is removed from the components of that circuit, to avoid power consumption and the generation of noise in the circuit when it is not being used.

The electrically adjustable potentiometers 177, 179 can be commercially available products such as the Xicor chip number X9C103.

Stylus Lift Mechanism

Figure 14:
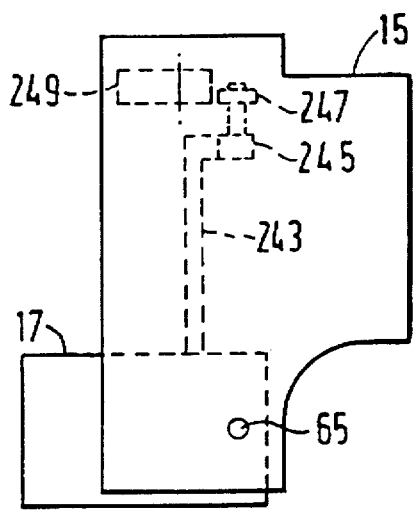
FIG. 14 is a schematic side view of the slider and the gauge holder with the stylus lift mechanism in its "stylus down" position.
Figure 15:
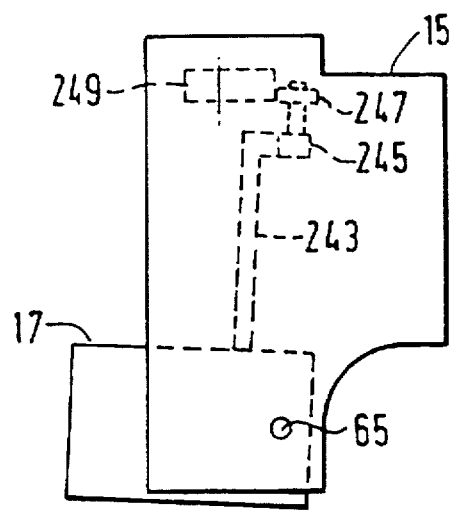
FIG. 15 is a schematic side view of the slider and the gauge holder with the stylus lift mechanism in its "stylus lifted" position.

FIGS. 14 and 15 show schematically the operation of a motorised stylus lift mechanism provided in the slider 15 and the gauge holder 17. This acts to pivot the gauge holder 17 about its pivot 65 on the slider 15, so as to lift the gauge housing 19 and stylus 21 of a gauge fitted to the gauge holder 17. This mechanism can be used to lift the stylus tip 23 off a workpiece 25 and to lower it again, for example to facilitate changing the workpiece 25 or to allow the stylus tip to be lifted over a ridge, groove or other area of the workpiece 25 which is not to be traversed.

A pair of columns 243 extend vertically upwards from the top of the gauge holder 17, and are joined by a crosspiece 245. The crosspiece 245 carries a roller 247. An eccentric cam 249 is mounted in the slider 15 opposite the roller 247, and is rotatable to act on the roller 247 for lifting the stylus 21 (see also FIGS. 16 to 19).

FIGS. 14 and 15 show schematically the operation of the cam 249, the roller 247 and the columns 243. In FIG. 14 the cam 249 is withdrawn from the roller 247, and the gauge holder 17 is in its "stylus down" position. In FIG. 15 the cam 249 has been rotated about its eccentric axis to move the roller 247 to the right in the Figure, rotating the columns 243 and the gauge holder 17 into the "stylus lifted" position.

Figure 16:
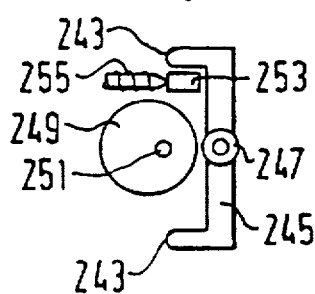
FIG. 16 is a schematic top view of the cam and the cam-following roller of the stylus lift mechanism in the "stylus down" position.
Figure 17:
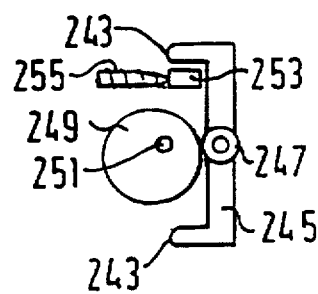
FIG. 17 is a schematic top view of the cam and the cam-following roller of the stylus lift mechanism with the cam just touching the roller.
Figure 18:
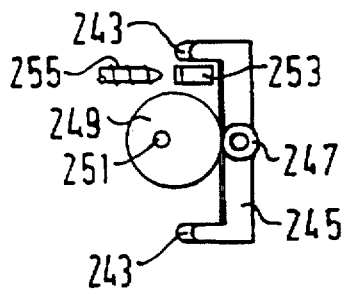
FIG. 18 is a schematic top view of the cam and the cam-following roller of the stylus lift mechanism in the "stylus lifted" position.

FIGS. 16 to 18 are schematic views from above showing the operation of the cam 249 and the roller 247. The cam 249 is mounted eccentrically on a spindle 251 for motorised operation. In the "stylus down" position shown in FIG. 16 the cam 249 is positioned to extend away from the roller 247. The roller 247 is driven towards the cam 249 by a spring which is described later. However, the movement of the roller 247 towards the cam 249 is limited and the roller 247 does not contact the cam 249 in this position. The position of the roller 247 and the gauge holder 17 in the "stylus down" position of FIG. 16 is defined by abutment between a stop 253 mounted on the top of the gauge holder 17 and an abutment screw 255 mounted on the slider 15. The abutment screw 255 can be rotated to drive it towards or away from the stop 253, to allow adjustment of the "stylus down" position. This abutment arrangement provides a precise repeatable "stylus down" position, so as to enable the metrological instrument to traverse the stylus across a part of the workpiece, lift the stylus over another part, and then lower the stylus to traverse a third part of the workpiece, while retaining direct comparability between the transducer output values before the stylus was lifted and the transducer output values after it has been set down again. This permits, for example, the relative heights of two spaced surfaces on a workpiece 25 to be determined.

As the cam 249 is rotated about the cam spindle 251, it comes into contact with the roller 247 as shown in FIG. 17. Further rotation of the cam 249 about the cam spindle 251 causes the cam 249 to push the roller 247 away from the cam spindle 251, rotating the roller 247, the crosspiece 245, the columns 243 and the gauge holder 17 about the pivot 65 and carrying the stop 253 away from the abutment screw 255. This brings the parts into the "stylus lifted" position shown in FIGS. 15 and 18.

Figure 19:
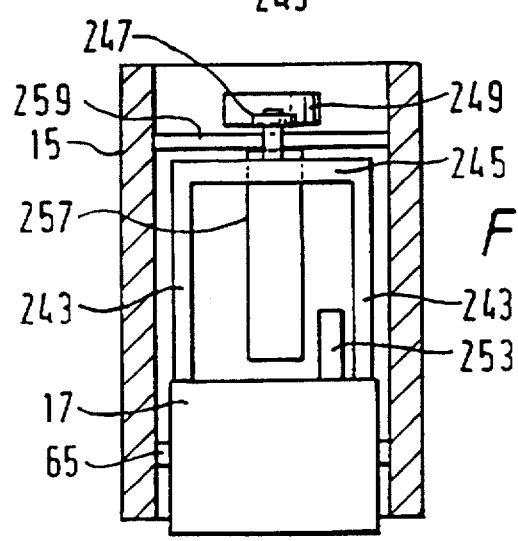
FIG. 19 is a view from the non-gauging end of the main components of the stylus lift mechanism.

FIG. 19 is a schematic view of the cam and roller mechanism from the position of the vertical slideway 13. As can be seen in FIG. 19, the cam 249 and the roller 247 are positioned near the top of the slider 15. The cam spindle 251 is driven by a motor 257, which is fitted below a plate 259 attached to the slider 15. The length of the columns 243 and the position of the cam 249 and the roller 247 near the top of the slider 15 reduce the angular range through which the cam 249 can drive the gauge holder 17, and give the motor 257 a mechanical advantage through the lever effect of the columns 243 about the pivot 65 as a fulcrum. The stop 253 is mounted lower down, directly on the top of the gauge holder 17.

Figure 20:
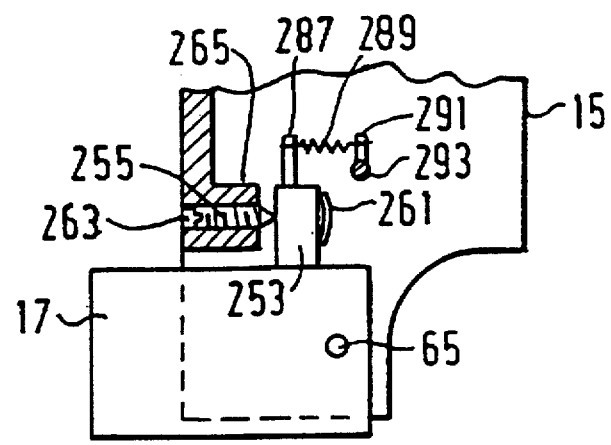
FIG. 20 is a side view of the abutment arrangement for defining the "stylus down" position of the stylus lift mechanism.

FIG. 20 is a schematic internal side view of the stop 253, the abutment screw 255 and associated components. The stop 253 is mounted securely on the top of the gauge holder 17, and is forced towards the abutment screw 255 by a leaf spring 261. When the gauge holder 17 is moved into the "stylus lifted" position, the stop 253 is withdrawn from the abutment screw 255 against the action of the leaf spring 261. In the "stylus down" position the leaf spring 261 presses the stop 253 against the abutment screw 255 with a force of approximately 8 newtons, which is sufficient to maintain the gauge holder 17 firmly in the "stylus down" position while the stylus tip 23 is moved over the surface of a workpiece 25 in a traverse operation.

The abutment screw 255 sits in a threaded bore 263 in a boss 265 on the slider 15. The bore 263 is open from the surface of the slider 15 towards the gauge, to allow adjustment of the abutment screw 255 with a screwdriver.

Figure 21:
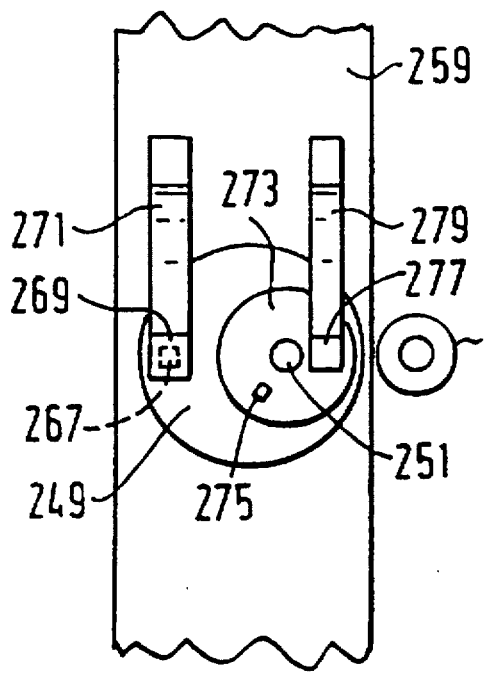
FIG. 21 is a view from above of the magnetic control system for the stylus lift mechanism in its "stylus down" position.
Figure 22:
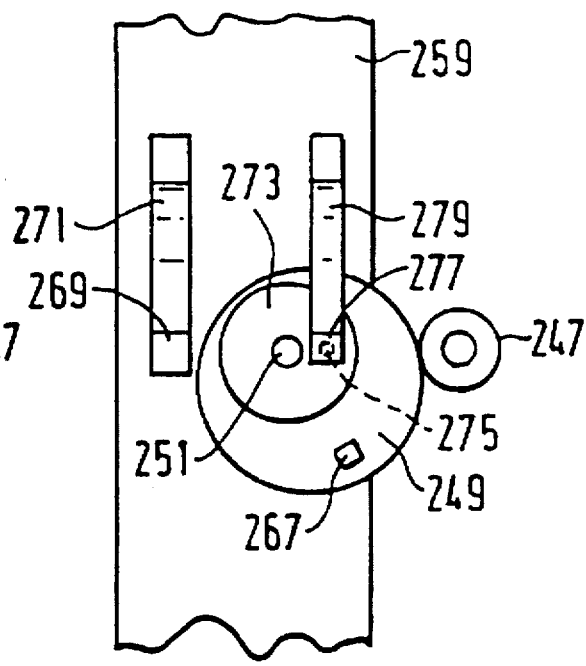
FIG. 22 is a view from above of the magnetic control system for the stylus lift mechanism in its "stylus lifted" position.
Figure 23:
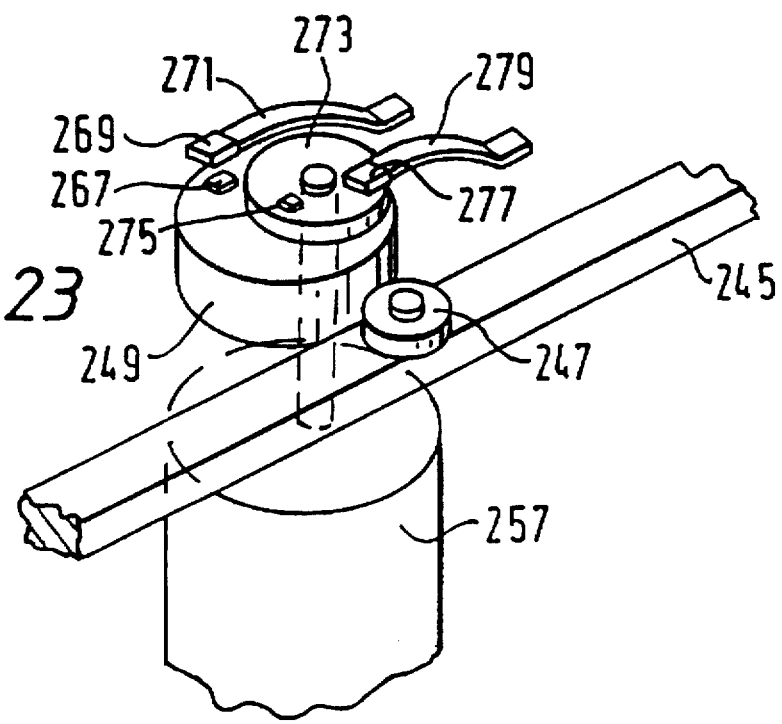
FIG. 23 is a view from the side of the magnetic control system for the stylus lift mechanism.

For correct operation of the stylus lift mechanism, the "stylus down" and "stylus lifted" positions must be detected so as to stop the motor 257 and prevent further rotation of the cam 249 around the cam spindle 251. This is done by an arrangement of magnets and Hall effect sensors illustrated in FIGS. 21 to 23. FIG. 21 shows the arrangement from above in the "stylus down" position. FIG. 22 shows the arrangement from above in the "stylus lifted" position. FIG. 23 shows the arrangement from the side.

A magnet 267 is fixed to the top of the cam 249, approximately at its angular position of greatest extent from the cam spindle 251. A Hall effect sensor 269 is mounted on plate 259 by a support 271, so as to extend over the cam 249 at a position on the far side of the cam spindle 251 from the roller 247. The Hall effect sensor 269 detects when the magnet 267 passes under it as shown in FIG. 21. In this position, the point of greatest radial extent on the cam 249 is remote from the roller 247, and the gauge holder 17 is in the "stylus down" position. Accordingly, an output from the Hall effect sensor 269 is used to stop further rotation of the motor 257 when the stylus is being lowered.

As shown in FIG. 23, a small diameter wheel 273 is mounted on the cam spindle 251 above the cam 249, so that it rotates with the cam spindle 251 and the cam 249. A magnet 275 is fixed to the top surface of the wheel 273 and a further Hall effect sensor 277 is mounted on the plate 259 via a support 279, so as to be positioned above the wheel 273 for detecting the magnet 275. An output from the Hall effect sensor 277, indicating that the magnet 275 on the wheel 273 is beneath it, is used as an indication that the cam 249 has driven the gauge holder 17 to the "stylus lifted" position.

A hole in the top surface of the slider 15 over the cam spindle 251 allows a tool such as a screwdriver to be inserted to rotate the wheel 273 while the motor 257 and the cam 249 are stationary. In this way, the angular position of the magnet 275 relative to the cam 249 can be adjusted. Since the "stylus lifted" position is effectively defined as the position in which the magnet 275 is beneath its Hall effect sensor 277, this permits adjustment of the angular position of the cam 249 for the "stylus lifted" position of the gauge holder 17. Since the radial extent of the cam 249 from the cam spindle 251 varies with its angular position, this adjustment has the effect of adjusting the height to which the stylus tip 23 is lifted at the "stylus lifted" position. This may be useful if the metrological instrument is being used to perform a measurement on the inside surface of a small radius bore in the workpiece 25, in which case the extent to which the stylus tip 23 is lifted must be limited to prevent it from hitting the opposite side of the bore.

Figure 24:
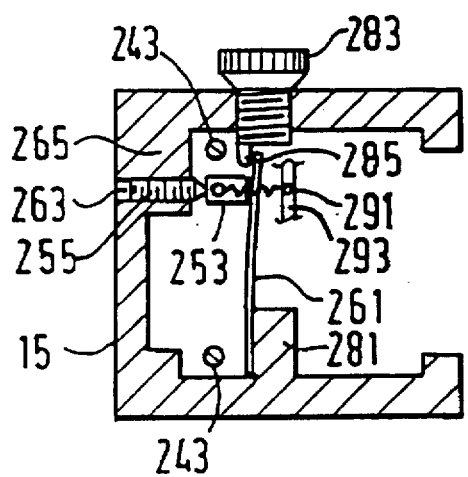
FIG. 24 is a view from above of the abutment arrangement of FIG. 20 with a leaf spring arranged for normal operation.
Figure 25:
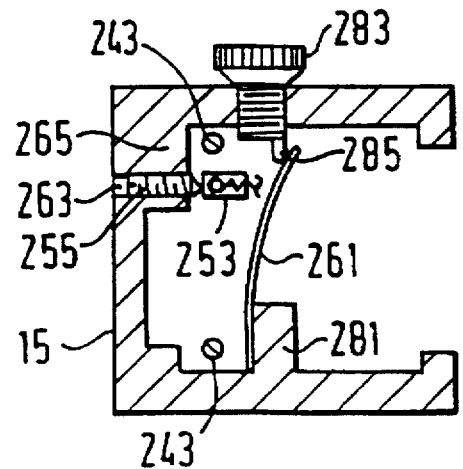
FIG. 25 is a view from above of the abutment arrangement of FIG. 20 with the leaf spring retracted to allow operation with a skid.

As discussed above with reference to FIG. 5, the gauge holder 17 must be able to rotate freely about the pivot 65 if a skid 67 is to be used. However, the force of the leaf spring 261 on the stop 253 prevents such free rotation. Accordingly, a mechanism for retracting the leaf spring 261 is provided, as illustrated in FIGS. 24 and 25, to permit operation with a skid 67. FIG. 24 is a view of this mechanism from above when the instrument is to be used without a skid 67 and the leaf spring 261 presses against the stop 253. FIG. 25 is a corresponding view showing the leaf spring 261 retracted.

The fixed end of the leaf spring 261 is secured to a fitting 281 on the side of the slider 15 remote from the stop 253, and the leaf spring 261 extends horizontally across the slider 15 so that its free end presses against the stop 253 as shown in FIG. 24. A pivot release knob 283 is fitted to the rear side of the slider 15, in line with the leaf spring 261. The pivot release knob 283 carries an eccentric pin 285 which extends towards the front side of the slider 15 sufficiently to overlap the free end of the leaf spring 261. In the position of the pivot release knob 283 shown in FIG. 24, the eccentric pin 285 is generally in line with the stop 253, and permits the leaf spring 261 to press against the stop 253. If the pivot release knob 283 is rotated through 180 degrees the eccentric pin 285 moves away from the stop 253 to the position shown in FIG. 25, and carries the free end of the leaf spring 261 with it. Accordingly, rotation of the pivot release knob 283 retracts the leaf spring 261, removing its force from the stop 253 and permitting the gauge holder 17 to rotate about the pivot 65.

As shown in FIG. 20 a pin 287 extends upwardly from the stop 253, and this is joined by a coil spring 289 to a pin 291 mounted on a horizontal rod 293 fixed to the side of the slider 15. The coil spring 289 is relatively weak, and does not significantly reduce the effect of the leaf spring 261 in holding the stop 253 against the abutment screw 255. However, when the leaf spring 261 is withdrawn to permit use of a skid 67, the coil spring 289 partially counteracts the weight of the gauge holder 17 and the gauge housing 19, to ensure that the force exerted by the skid 67 on the surface of the workpiece 25 is less than 0.5 newtons as required by British Standard 1134.

For normal operation without a skid, the abutment screw 255 is normally adjusted so that the gauge holder 17 extends substantially parallel with the arm 3. However, for use with a skid 67 it is normally desirable to allow the gauge housing 19 to slope down slightly towards the stylus tip 23. The abutment screw 255 can be rotated to withdraw it from the stop 253 slightly when a skid is to be used, to permit this movement.

The motorised stylus lift mechanism can be used if the main housing 1 is mounted to be vertically driven on a column. However, in this case the stylus tip 23 can also be raised and lowered automatically by driving the main housing 1 up and down the column. The motorised stylus lift is particularly useful when the instrument is used with the main housing 1 standing on the bench 5. Under these circumstances, the motorised stylus lift allows automatic lifting of the stylus and subsequent return of it to a gauging position without the need to move the main housing 1.

Control Electronics and Software

FIG. 26 is a schematic view of the control electronics of the illustrated metrological instrument. A gauging unit 295, including the circuits of FIGS. 11, 12 and 13, is connected to the inductor coil 77 in the gauge housing 19. A traverse unit 297 controls the movement of the arm 3, and is connected to the corresponding mechanical components in the main housing 1, including the variable speed electric motor 145 for driving the arm 3, the detector unit 127 for the grating 125, and any optical sensors arranged to detect the bracket 131 of the marker strip 129. The traverse unit 297 will be well understood by the those skilled in the art, and is largely conventional except that it uses feedback from the grating detector unit 127 to control the speed of the motor 145 in place of an output from a shaft encoder, as has been described above.

A control circuit for the motorised stylus lift unit can be readily designed by those skilled in the art to drive the stylus lift motor 257 and detect and respond to the outputs of the Hall effect sensors 269, 277. This circuit can be combined with the traverse unit 297, or alternatively a separate motorised stylus lift control unit 299 can be provided.

The control panel 37 is operated by a conventional control panel unit 301.

A control system 303 receives data from and controls each of the gauging unit 295, the traverse unit 297, the stylus lift control unit 299 and the control panel unit 301. Additionally, the control system 303 is connected to the data sockets 45, 47 to enable it to communicate with any externally connected devices, such as the remote controller 55 or, in the case that the illustrated instrument is mounted for vertical movement on a column, the control system for the column drive. Additionally, the gauging unit 295 is directly connected to the traverse unit 297. This enables the gauging unit 295 to receive data logging pulses from the traverse unit 297, generated in a conventional manner in response to the output from the grating detector unit 127. This enables the gauging unit 295 to be set up to output data concerning the position of the stylus tip 23 automatically in synchronism with the data logging pulses from the traverse unit 297, as an alternative to outputting data in response to a request from the control system 303.

Figure 27:
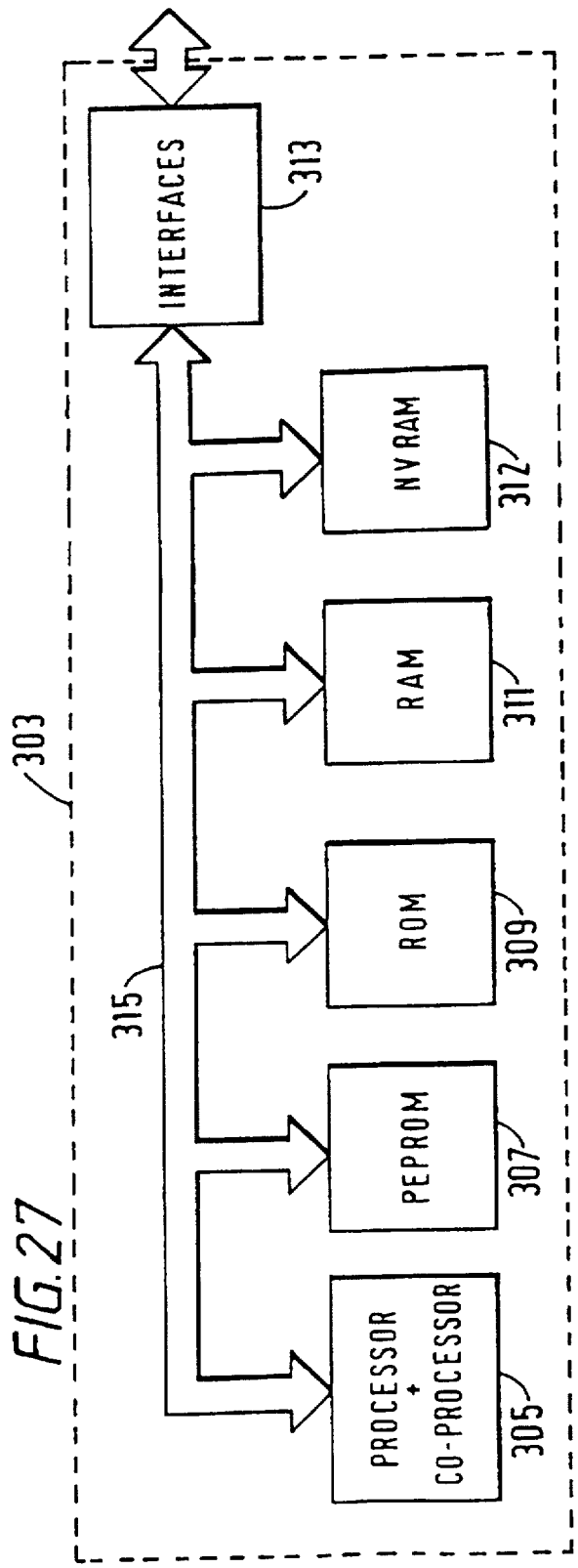
FIG. 27 is a block diagram of the control system.

As shown in FIG. 27, the control system 303 comprises a processing unit 305, which can be conveniently be provided by an Intel 186 processor and an Intel 187 co-processor, a programmable and erasable programmable read only memory (PEPROM) 307, a read only memory (ROM) 309, a random access memory (RAM) 311, a non-volatile random access memory (NVRAM) 312, and an interface unit 313 for connecting the control system 303 with the other components shown on FIG. 26. The parts of the control system 303 communicate with each other via a bus 315.

The PEPROM is also known as a "flash EPROM", and is a memory which is erasable electrically in selected blocks or pages. Its function is between that of a conventional EEPROM, which is erased as a unit, and an EAROM, which is erasable address by address.

The NVRAM is a battery-backed static CMOS RAM, which retains data when power is removed from the metrological instrument.

Figure 28:
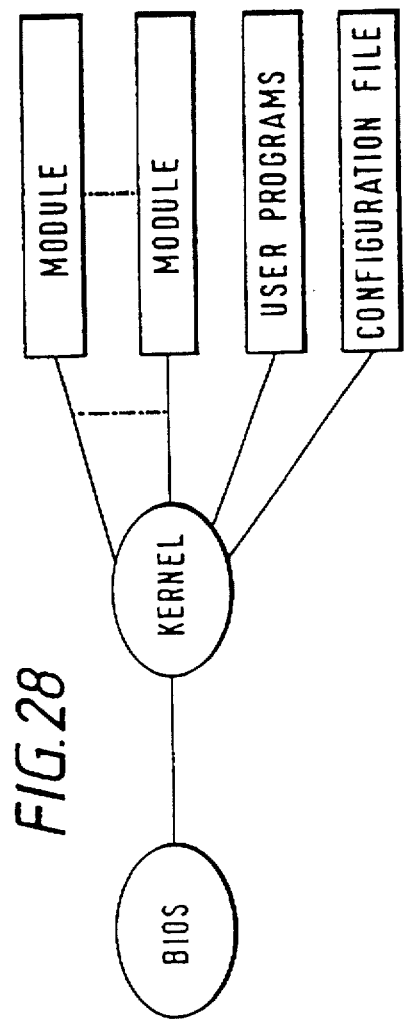
FIG. 28 is a schematic diagram of the software for operating the control system of FIG. 27.

The processing unit 305 operates under the control of stored software having an overall software structure as shown in FIG. 28. A BIOS (trade mark) system and an operating system kernel have overall control of the processing unit 305. An array of module programs provide instructions for enabling the processing unit 305 to carry out a respective operation or a group of associated operations, which may be internal to the control system 303 or which may involve other parts of the apparatus. One or more user programs may be provided to define particular sequences of operations for the metrological instrument which may be required by a particular user. A configuration file can be used to adjust the operational configuration of the instrument, typically by changing default data values in one or more of the module programs so as to adapt the operation of the module programs to a particular style of operation of the metrological instrument.

The BIOS system is permanently stored in the ROM 309. The kernel and the module programs are stored in the PEPROM 307. Any user programs and the configuration file are stored in the NVRAM 312. The kernel acts in a conventional manner to interface with all of the other programs in the software and allocate resources while the programs are run. When the instrument is turned on by the on/off switch 41, the kernel program is run automatically, and it loads the stored module programs from the PEPROM 307 into the RAM 311. Default data settings or similar parameters in the module programs as stored in the RAM 311 are modified from the versions stored in the PEPROM 307 if this is specified in the configuration file. The kernel also uses the module programs to build up a suite of menus to be made available to the operator through the control panel 37.

It also allocates any special functions to any of the keys of the control panel 37 in accordance with specifications contained in the other programs.

With this software arrangement a plurality of metrological instruments as described herein can each be provided with an identical standard kernel program and a set of module programs copied from a single master set, although it is not necessary for every instrument to contain every module program of the set and different instruments may contain different module programs. In this way, the capabilities of the instruments can be adjusted by selection of the module programs provided to it. The operation of the standard module programs can be adjusted in accordance with a user's requirements by means of the configuration file.

Additionally, an instrument can be given special sets of operation sequences to meet the requirements of a user through the user programs. As is discussed below, the user can be given a facility to alter the user programs and the configuration file and to alter the selection of which module programs are stored in the instrument.

Examples of module programs which may be stored in the control system 303 are as follows.

MODULE "FORMATTING"

This formats information for output on the display of the control panel 37 and also for output to a printer connected to one of the data sockets 45, 47. It can be set up to output data in metric or British imperial units.

MODULE "TRAVERSE UNIT SLAVE"

This module contains the instructions necessary for control of the traverse unit 297. It may be called in response to operation of a key of the control panel 37 or by running a user program.

MODULE "COLUMN SLAVE"

This contains the instructions necessary to control the drive unit of a column on which the main housing may be mounted.

MODULE "STYLUS LIFT SLAVE"

This contains the instructions necessary to control the stylus lift control unit 299.

MODULE "MEASURE AND ANALYSE"

This module will conduct a measurement sequence which has previously been specified through the control panel 37 or in a user program, and will move the arm 3 as required, capture the stylus tip data from the gauging unit 295, analyse the data together with filtering and form removal if required and generate specified surface finish parameters, display and/or print the results if required, and update a results menu. Operation of this module will typically require running of other modules, such as module "Form", module "Filtering", the appropriate parameter modules and module "Printing".

MODULE "FORM"

This module processes data received from the traverse unit 297 to remove overall form (shape) of the surface of the workpiece 25 from the input data. For example, if the workpiece 25 has a sloping surface, this module may remove the best fit straight line from the data, so as to provide roughness data representing the variation of individual points from the best fit straight line. It can also be set to remove other shapes, such as the best fit circular arc.

MODULE "FILTERING"

This module can be run to perform any one of a number of mathematical filtering operations on the measured data. It can be used to make the instrument output roughness data or alternatively to output waviness data.

MODULE "PARAMETER SUITE Ra"

This calculates the Ra group of parameters from the measurement data.

MODULE "PARAMETER SUITE Rt"

This calculates the Rt group of parameters from the measurement data.

MODULE "PARAMETER SUITE R3y"

This module calculates the R3y group of parameters from the measurement data.

MODULE "PARAMETER SUITE Delq"

This parameter suite calculates the Delq group of parameters from the measurement data.

MODULE "PARAMETER SUITE S"

This module calculates the S parameter from the measurement data.

MODULE "PARAMETER SUITE Sm"

This module calculates the Sm parameter from the measurement data.

MODULE "PARAMETER SUITE L"

This module calculates the L parameter from the measurement data.

MODULE "PARAMETER SUITE Tp"

This module calculates the tp % parameters from the measurement data.

MODULE "RESULTS"

This performs the operations necessary to store results required for later output to the display of the control panel 37 or to a printer.

MODULE "RESULTS MENU"

This module controls the results menu which is updated by module "Measure and Analyse". It will, for example, clear the results menu, add new results to the menu, and perform certain automatic modifications to the order in which results are displayed and the manner in which they are displayed in order to highlight the results where tolerance values associated with measurements or parameters have failed.

MODULE "SELECTION OF PARAMETERS"

This module can be activated through keys of the control panel 37 or by a user program to respond to an instruction for selecting or deselecting any of the surface finish parameters which can be calculated by any of the parameter suite modules. In particular, some parameter suite modules can calculate more than one parameter, and this module performs the necessary operations to select which possible parameters are calculated on a call of a parameter suite module.

MODULE "TOLERANCE"

This module performs the operations necessary to allow the tolerance values associated with a parameter to be set and altered.

MODULE "GAUGE CALIBRATION"

This module contains the instructions necessary to drive the instrument through a calibration routine, and provides a choice of calibration using a calibration ball, three line check calibration using a three line standard, and Ra check calibration using a Ra calibration standard. It also contains the instructions necessary to drive the instrument through the automatic adjustment operation for the electrically adjustable potentiometers 177, 179 of FIG. 11. In addition to performing calibration, it also provides various messages to the display of the control panel 37, particularly to alert an operator if calibration has failed for any reason.

MODULE "GAUGE"

This module contains the instructions necessary to control logging of data from the gauging unit 295 as the stylus tip 23 is traversed over a workpiece 25, and it also provides automatic handling of a "gauge collision" when the data from the gauging unit 295 indicates that the stylus tip 23 has risen to the end of its permitted range and further movement of the arm 3 may cause it damage. This module takes into account input data indicating the type of stylus 21 in the gauge fitted to the gauge holder 17.

MODULE "PRINTING"

This performs the operations necessary to output data to a printer.

MODULE "KEYS"

This module contains instructions to assign special meanings to keys on the control panel 37.

MODULE "PROGRAM"

This module contains support instructions for running a user program.

The precise instructions contained in each module program will depend on the particular construction of the metrological instrument and the details of control system 303. However, those skilled in the art will readily understand the types of instructions required in the modules.

The operation of the metrological instrument may be conducted through the control panel 37, by means of stored user programs, or partly through control panel instructions and partly by user programs. Additionally, with appropriate programming and module support it can be set up to cooperate with an external device.

The control panel 37 is illustrated in FIG. 2. It has a liquid crystal display 317 and various keys. The operations of the keys can be altered through reprogramming. However, the normal set up for the keys is as follows.

Five keys 319 across the top of the control panel 37 are special purpose function keys F1 to F5. These keys allow five special functions to be programmed into the operation of the control panel 37 without disrupting the normal operation of the other keys. In the absence of other instructions, the module program "Keys" sets up function keys F1 to F3 for controlling a printer plugged into the main housing 1, so that pressing key F1 begins a print operation in accordance with options set up in a printer menu, pressing key F2 causes a header to be printed, and pressing key F3 causes a printer form feed. The user programs can allocate special functions or operations to the pressing of any of the function keys 319.

Left and right arrow keys 321 allow direct operator control over movement of the arm 3. A brief press on either of these keys will move the arm 3 at a preset speed for a preset incremental distance. The magnitude of the preset speed and the preset incremental distance are set in the module program "Traverse Unit Slave". Additionally, if an operator holds down one of the left and right arrow keys 321 instead of pressing briefly and releasing, the speed of movement of the arm 3 increases for as long as the key is held down.

Up and down arrow keys 323 allow direct operator control of up and down movement of the stylus tip 23. This can either be through the motorised stylus lift unit or through a column drive mechanism if the main housing 1 is mounted on a column. The software configuration will set which of these methods of moving the stylus tip 23 is operated by the up and down arrow keys 323. If movement is via a column drive, the operation is controlled by the module program "column slave", and the operation is similar to the operation of the left and right arrow keys 321. If the stylus tip vertical movement is via the motorised stylus lift, the operation is controlled by the module program "stylus lift slave". In this case, there is no opportunity for accelerating movement, and the keys are used to move between the "stylus lifted" and the "stylus down" positions of the motorised stylus lift.

The operator is able to set up and control operations of the instrument through a menu selection system controlled by menu control keys 325, 327, 329. As mentioned above, the kernel program builds up a set of menus from the available module programs as part of the initial operation when the machine is turned on at the on/off switch 41. For example, a printer menu allows setting of printing parameters before operation of a printer through the normal function of function key F1. Other menus will allow control of the traverse unit for moving the arm 3 and control of the manner in which measurement data is processed, for example. Menu select keys 325 allow the operator to step up or step down through the list of menus, to bring the desired menu onto the display 317. Item select keys 327 allow the operator to step up or down through the items listed on the selected menu. Value select keys 329 allow the operator to alter the value of the selected item up or down. In this way, the operator can select parameter values and set up sequences of actions for the instrument to perform. Using the menu control keys 325, 327, 329 the operator can also select a stored user program for operation. An action key 331 is pressed to initiate an operation or run a program which the operator has selected through the menu control keys 325, 327, 329. The action key 331 can also be pressed while an operation is taking place or a program is being run to stop the operation or program.

The software arrangement and the operation of the control panel 37 allow a large choice of types of operation for the instrument, with varying degrees of automation, as illustrated in the following operation examples.

OPERATION EXAMPLE 1

An operator arranges a workpiece 25 on a workpiece holder 29 on the bench 5, drives the arm 3 with the left and right arrow keys 321 to position the stylus tip 23 over the workpiece 25, and carefully turns the vertical adjust knob 63 to bring the stylus tip 23 down onto the workpiece 25. Then the operator uses the menu control keys 325, 327, 329 to define a measurement operation with a selected traverse length and selected processing of the measurement results to obtain the desired surface finish parameters, and instructs that the results should be displayed on the display 317 and added to the results menu for later printing. The operator then presses the action key 331 to instruct the machine to carry out the operation and observes the displayed results. Then the operator presses function key F1 to print the results in a predefined format previously set up in the printer menu.

OPERATION EXAMPLE 2

A user program defines a sequence of movements of the arm 3 and lifting and setting down of the stylus tip 23 with the motorised stylus lift, so as to traverse the stylus tip 23 across a workplace 25 several times. The operator has to move the workpiece 25 between traverses, e.g. by rotating it or moving it towards the front or the rear side of the instrument, so that successive traverses follow different paths over the surface of the workpiece 25. The measurement data from each traverse is processed in a predetermined manner to obtain the desired surface finish parameters and the results are printed out in a block of print having a set format to provide a report on the workpiece concerned. The program is written so that the instrument stops after each traverse to allow the operator to move the workpiece 25 and the operator initiates the next traverse by pressing a defined one of the function keys 319 or the action key 331. After setting up a workpiece 25 in the correct position and correctly adjusting the height of the stylus tip 23 the operator calls up the program through the menu control keys 325, 327, 329 and then runs the program, moving the workplace 25 and pressing the selected function key 319 or the action key 331 as required.

OPERATION EXAMPLE 3

Instead of manual movement of the workplace 25 by the operator, a robot arm or other mechanism may be provided to bring workplaces 25 to the correct position and to move them through a series of positions as required by the user program. The operator can sit at a control panel for the machine which moves the workpiece 25 and can also control the metrological instrument in the same manner as described in Operation Example 2, by use of the remote controller 55.

OPERATION EXAMPLE 4

In this example the mechanism for moving and adjusting the workpiece 25 is also fully automatic and programmable, and is set up to exchange workpieces 25 and to move them through a predetermined series of positions in response to input control signals. The user program is similar to the user program in Operation Examples 2 and 3, but instead of performing the next traverse operation in response to user operation of a key the program instructs the next traverse operation in response to a "ready" signal from the mechanism which moves the workpiece 25, and instead of or as well as outputting a message to the display 317 to state that a traverse operation has been completed the program outputs an instruction to the mechanism which moves the workpiece 25 to tell it to move to the next position. Additionally, at the end of a sequence of measurement traverses the program outputs an instruction to change the workpiece and after receiving the appropriate "ready" signal it begins the sequence of measurement traverses again. The metrological instrument communicates with the mechanism that moves the workpieces through a cable plugged into one of the data sockets 45, 47. In this way, the instrument can be set up to perform a fully automatic measuring operation on a series of workpieces supplied to it by an automatic workpiece handling mechanism and no operator intervention is required.

OPERATION EXAMPLE 5

With an instrument set up in accordance with Operation Example 2, it may in practice be required to perform a complex set of measurement traverses on any one of three types of workpiece 25, each requiring a respective set of measurement traverses, and additionally the rules of the establishment in which the instrument is being used may state that every day the instrument must be calibrated with each of ball calibration, three line calibration and Ra calibration as well as performing automatic adjustment of the gauging circuit using the electrically adjustable potentiometers 177, 179. For convenience, a special user program may be set up to perform each of the calibration operations and the gauging circuit adjustment operation in turn, and a user program may be set up for each of the required sequences of measurement traverses. The operator then largely works by calling up the required program through the menu operation keys 325, 327, 329 and instructing the machine to execute the selected program using the action key 331.

OPERATION EXAMPLE 6

This example is substantially the same as Operation Example 5. However, the user programs are written so that the programs are called up as a set through the menu operation keys 325, 327, 329 and the different programs are allocated to different ones of the function keys 319. In this example the operator selects program operation through the menu control keys 325, 327, 329 and then presses the function keys 319 as desired to carry out the required operations. This may provide more convenient operation than Operation Example 5, because selection of a different operation is done by pressing a different one of the function keys 319 rather than by stepping through a program menu.

Figure 29A:
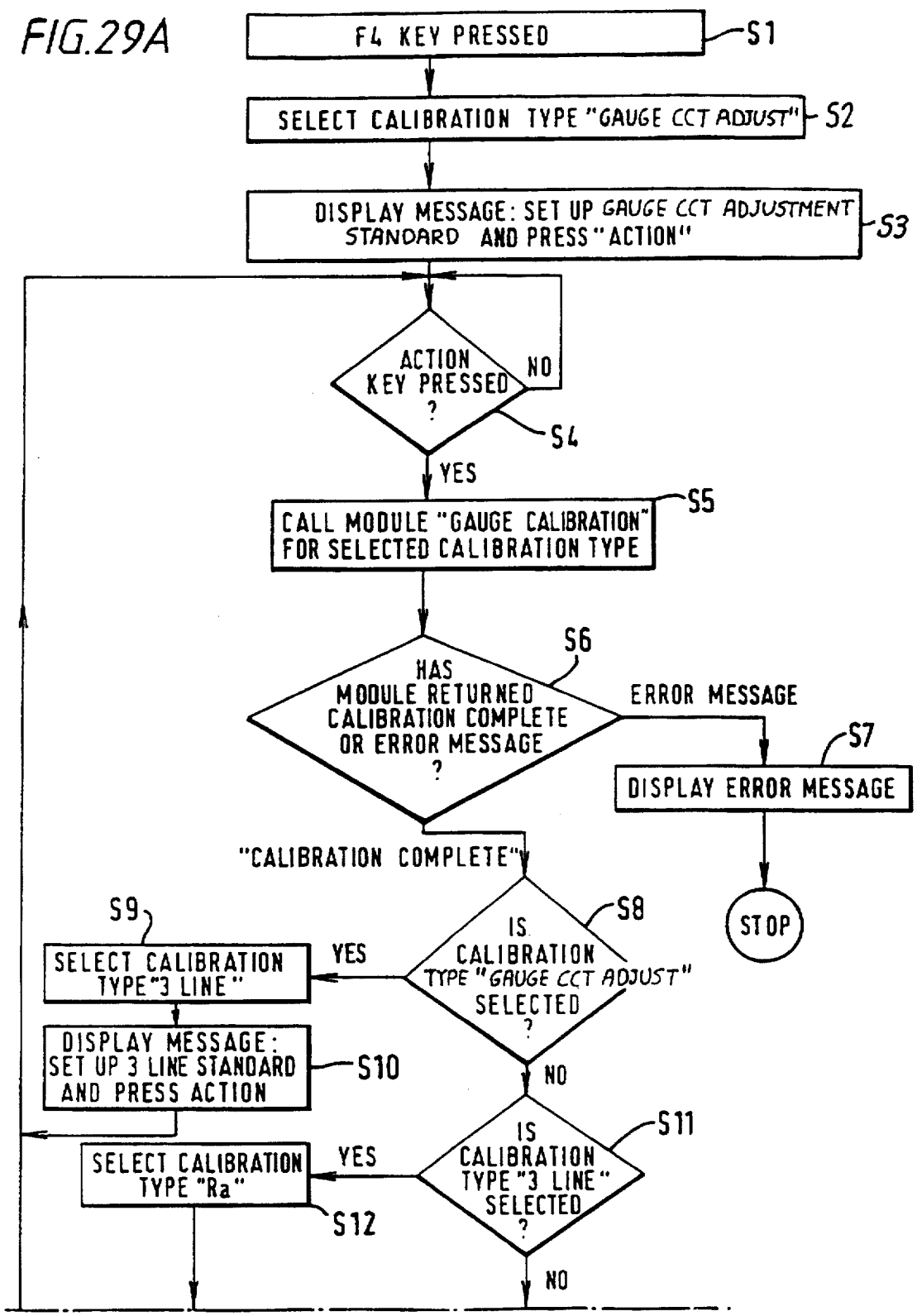
FIG. 29 is a flow diagram of a first example of a user program.
Figure 29B:
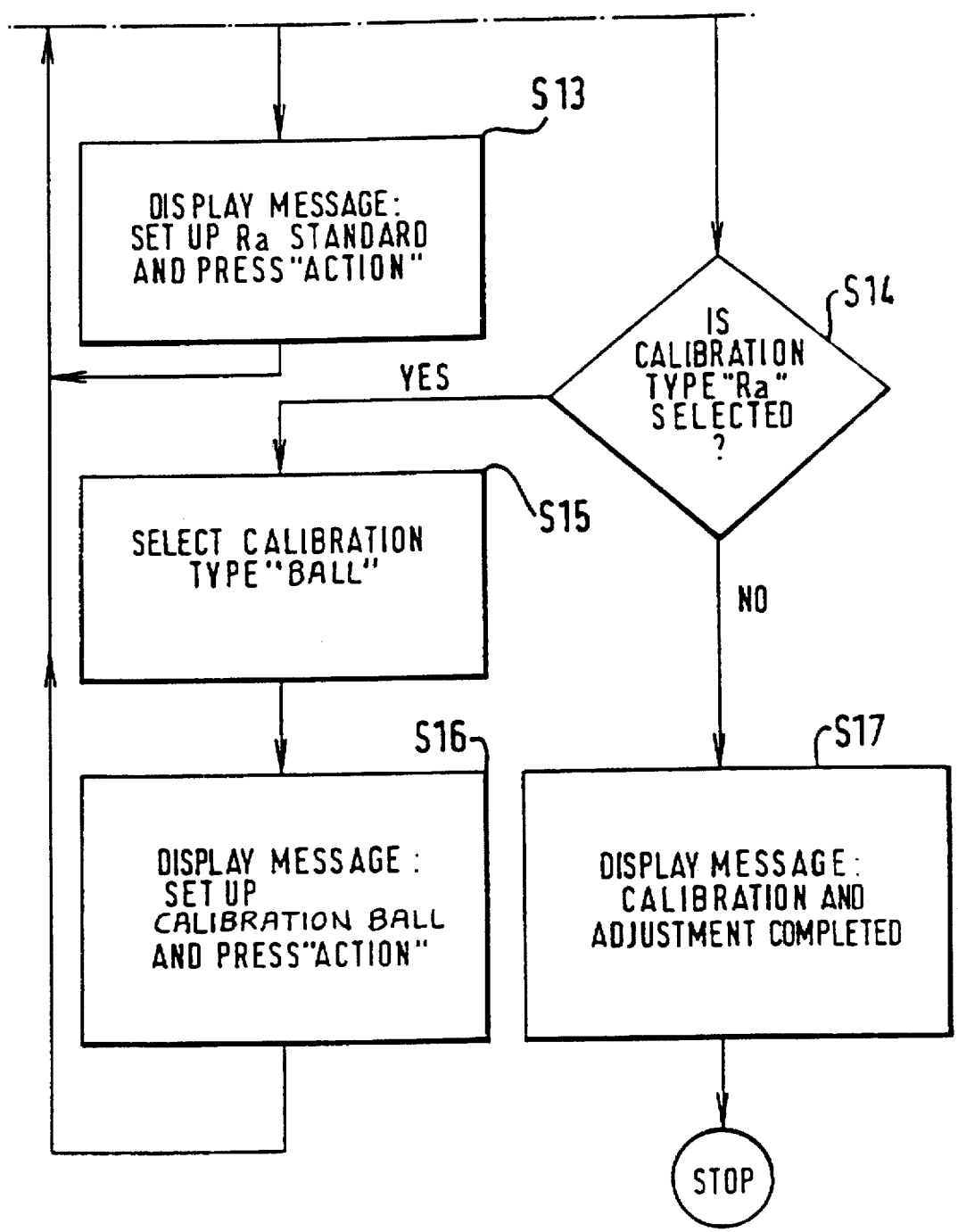

FIG. 29 is a flow diagram illustrating a user program for performing the calibration sequence of Operation Example 6. The calibration sequence is initiated in step S1 by the operator pressing the function key F4. In step S2 the program selects gauge circuit adjustment for adjusting the electrically adjustable potentiometers 177, 179. In step S3 it displays a message to the operator instructing him to set up an appropriate gauge circuit adjustment standard as the workpiece 25.

In step S4 the program waits for the operator to press the action key to indicate that the calibration standard workpiece (in this case the gauge circuit adjustment standard) has been set up. When the operator presses the action key the program moves to step S5, in which it calls the module "Gauge Calibration" for the selected calibration type (which in this case is gauge circuit adjustment type calibration). In step S6 the program tests the result of the calibration operation, to determine whether calibration has been completed or whether it has failed and the module "Gauge Calibration" has output an error message. If the calibration has failed, the program displays the error message in step S7 and then stops. If calibration has successfully been completed, the program moves on to step S8.

In step S8 the program tests whether the selected calibration type is type "gauge circuit adjustment". If it is, it moves to step S9 in which it selects calibration type "three line" for three line calibration in place of calibration type "gauge circuit adjustment" It then moves to step S10 in which it displays a message instructing the operator to set up the three line standard calibration workpiece. The program then returns to step S4 and waits for the operator to press the action key to indicate that the calibration workpiece has been set up. After the operator presses the action key, steps S5 and S6 are repeated and provided that the three line calibration is successfully completed the program returns to step S8. If it is determined in step S8 that the selected calibration type is not type "gauge circuit adjust", the program moves to step S11 in which it tests whether the selected calibration type is type "three line" If it is, the program moves to step S12 where the calibration type is changed to type "Ra" and in step S13 the program displays a message instructing the operator to set up the Ra standard calibration workpiece. The program then returns again to step S4 to wait for the action key to be pressed and then conduct a calibration operation.

If the selected calibration type is not "three line" in step S11, the program moves to step S14, where it tests whether the selected calibration type is type "Ra". If it is, the program moves to step S15 to select calibration type "ball" and in step S16 it displays a message instructing the operator to set up a calibration ball as the workpiece 25. It then returns to step S4. If the selected calibration type is not type "Ra" in step S14, the program concludes that it has carried out all of the calibration operations. The program moves to step S17 and displays a message to inform the operator that the calibration and adjustment sequence is completed, and then stops.

It can be seen that this program explicitly makes use of the program module "Gauge Calibration", and supplies the kernel with selection information required for calling the module. When calibration type "Ra" is selected, the module "Gauge Calibration" will in turn call the module "Filtering", and other modules such as module "Traverse Unit Slave" will also inevitably be required.

The routine, for adjusting the electrically adjustable potentiometers 177, 179 of the gauging circuit, may be provided in program module "Gauge" rather than program module "Gauge Calibration". In this case the flow diagram of FIG. 29 will need to be altered to ensure that the appropriate module is called for each operation.

FIG. 30 is a flow diagram of a user program for conducting a two part measurement traverse, and it could for example form part of a multi-traverse program for Operation Example 2. In step S20 the program sets up a measurement configuration, for example by setting the traverse length for a measurement traverse, selecting measurement analysis parameters and setting filtering. This may use program modules "Program" and "Filter".

The program then lifts the stylus tip 23 in step S21, using module "Stylus Lift Slave". In step S22 it moves the arm to a set position 30 mm extended from its fully retracted zero position, using module "Traverse Unit Slave". Then in step S23 the program lowers the stylus tip 23 using module "Stylus Lift Slave", and in step S24 it performs a measurement sequence using module "Measure and Analyse". The program does not contain any steps for displaying or storing data as these operations are conducted automatically by module "Measure and Analyse" as part of performing a measurement sequence.

After the end of the measurement sequence the program lifts the stylus tip 23 again in step S25, using module "Stylus Lift Slave" and retracts the arm 3 into the main housing 1 by 12 mm using module "Traverse Unit Slave". With the arm in this position the program changes the length of traverse for a measurement operation to 5.6 mm in step S27, using module "Filter", before again lowering the stylus tip 23 in step S28 using module "Stylus Lift Slave". Then it performs a further measurement sequence in step S29 using module "Measure and Analyse".

The two-part measurement traverse has now been completed, and the program lifts the stylus tip 23 clear of the workpiece 25 in step S30, using module "Stylus Lift Slave". The program then stops.

The program of FIG. 30 illustrates the manner in which a relatively simple user program may rely on several different program modules.

If the requirements of a user change, the user may wish to add or substitute new user programs in the software arrangement of FIG. 28, or may wish to change the configuration file. Additionally, the user may wish to use a program module not previously used, which is not currently included in the software arrangement. For example, the user may wish to obtain data for surface finish parameters which previously were not of interest and the appropriate parameter suite module may not be stored in the instrument. Accordingly, the user may be provided with a re-programming facility as illustrated in FIG. 31. With this facility, the user is provided with a reconfiguration software system to be run on a conventional personal computer (PC) 333 equipped with a disk drive 335.

The reconfiguration software system includes a reconfiguration program which is run on the PC 333 together with a copy of the kernel and a library of program modules. By means of the reconfiguration program the user operating the PC 333 can create new user programs and a new configuration file. The reconfiguration program provides options to the user and interprets the user commands so as to construct a user program in the format required by the software structure of FIG. 28 in the measurement instrument. Most conveniently, the user programs are structured as a set of instructions providing commands and associated parameter and other data, and the program itself is treated as data to be interpreted by the module "Program". This interpretation, which effectively constitutes running a user program, is the main function of the module "Program". In a similar manner, the reconfiguration program constrains the user operating the PC 333 to create a new configuration file in the appropriate format for interpretation by the kernel.

Operations for the metrological instrument selected through the control panel 37 using the menu control keys 325, 327, 329 will not be available, and instructions contained in a user program cannot be executed, if any necessary program module is not stored within the metrological instrument. A further function of the reconfiguration program running in the PC 333 is to allow the user to select the desired modules to be downloaded into the instrument from the library of modules provided in the reconfiguration software system. The reconfiguration program is set up so that it can associate each permitted instruction for a user program with an identification of the module or modules required for the instruction to be carried out. This enables the reconfiguration program to compel the user to enter all necessary parameter and selection data to be associated with that instruction.

Additionally, an optional facility in the reconfiguration program will monitor a user instruction program as it is created or will analyse a user instruction program after creation, to create a list of all the modules required for operation of the program and automatic selection of those modules for downloading. Alternatively, the user can select the modules to be downloaded directly through a module selection facility, and this can be used in addition to the automatic selection facility so that a user can select additional modules for downloading even though the additional modules are not required by any user program. This may be important if the user anticipates that such modules may be required for operations set up through the control panel 37 rather than through user programs.

The user programs and the configuration file set up using the reconfiguration program are transferred to a disk in the disk drive 335. The disk 337 is then transferred to a disk reader 339 which can be plugged into the serial data socket 47 in the main housing 1 of the metrological instrument. The metrological instrument then conducts a "reload" operation in which the programs on the disk 337 are read, and the NVRAM 312 is erased and rewritten with the replacement programs read from the disk 337.

If the instrument to be reconfigured already contains all of the program modules required after reconfiguration, the disk 337 may carry no program modules and the PEPROM 307 may remain unaltered by the "reload" operation. However, if any additional program modules are required, the PEPROM 307 must be altered. Erasing a block or page of the PEPROM 307 tends to disrupt the address organisation of all data stored on it. Therefore if any additional program modules are required, the complete set of program modules for the instrument must be written to the disk 337 together with a replacement kernel program, and PEPROM 307 is erased in the "reload" operation and rewritten with the replacement set of program modules and the replacement kernel from the disk 337.

Although the user can select which modules from the library in the reconfiguration software system are to be written to the disk 337 for loading into the metrological instrument, the user cannot alter the program instructions of the module programs. Additionally, the user cannot alter the kernel and this is automatically included with the program modules whenever any program modules are written to the disk 337. Since the kernel is never altered by the user, there is no need for it to be stored in the erasable PEPROM and reloaded each time the program modules are reloaded. However, this provides a convenient way of loading a replacement kernel program if it is updated in a new software release. If new program modules become available or existing program modules are updated, these can be made available to users by distributing an updated program module library for the reconfiguration software system.

After a new software configuration for the instrument has been created using the PC 333 and written to a disk 337, the disk 337 and the portable plug-in disk reader 339 can be easily transported to a metrological instrument in a different part of the user's establishment, and they can be carried round from one instrument to another to enable the new configuration to be loaded into several instruments.

The precise details of the reconfiguration program will depend on the nature of the software structure of the metrological instrument. However, it will be readily apparent to those skilled in the art how such a program could be created. Conveniently, the program may follow a question and answer routine or provide menus of options, so as to constrain a user only to enter allowable instructions and to require instructions to be associated with complete lists of required parameters and other data.

Alternatives and Modifications

The above embodiment has been described by way of an example, and various modifications and alternatives will be apparent to those skilled in the art. Some examples of such modifications and alternatives will now be discussed.

Various alternative drive mechanisms for the arm 3 are possible. It is preferred not to use a direct connection between the motor 145 and the arm 3, or a connection only through gearing, as this will tend to transmit motor vibration to the arm 3.

In the gauging circuit of FIG. 11 the capacitor 167 across the inductor coil 77 can be omitted if it is not desired to form a tuned circuit with the coil 77. For example, it may not be necessary to reject spurious frequency signals at this stage if the later circuits are immune to them, and a different transducer construction may avoid generating higher order harmonic distortions. Equally, the resistive adjustment bridge 173, 175, 177 can be omitted if the resistive balance of the coil 77 provides the accuracy required, or manual adjustment can be used. Similarly, the phase shift network including the electrically adjustable potentiometer 179 can be omitted if this phase correction is not required or may be made manually adjustable. Alternatively, the phase shift network can be applied to the signal output by the summing circuit 159 instead of the reference output by the difference circuit 161, although this is not preferred because the signal output from the summing circuit 159 has a variable amplitude.

Various alternatives to the converter circuit of FIG. 12 are possible.

The circuits of FIGS. 11 to 13 can be applied to non-portable instruments.

The instrument can be operated without the motorised stylus lift mechanism described with reference to FIGS. 14 to 25. In this case, a simple locking mechanism is provided to lock the gauge holder 17 against rotation about the pivot 65 when the instrument is used without a skid 67. Movement of the stylus tip 23 away from a workpiece 25 and down towards it will have to be done manually on each occasion using the vertical adjust knob 63 on the slider 15.

Alternatively, the motorised stylus lift can be provided, but with a different mechanism. For example, the motorised cam arrangement could be replaced by a solenoid for magnetically attracting the crosspiece 245 into the "stylus lifted" position. In this case, it may be necessary to provide some damping arrangement to avoid violent movement of the gauge holder 17. The gauge holder 17 could be provided with a different line of movement instead of rotation about the pivot 65, but the pivoting movement is preferred as this provides a strong and rigid connection. The stylus lift mechanism could be arranged to act directly on the stylus 21, so as to lift the stylus without lifting the stylus housing 19, for example by rotating the stylus about its pivot 71.

However, such an arrangement may require a special construction for the gauge, and pivoting movement about the pivot 65 for the gauge holder 17 tends to enable a greater vertical range in the lifting movement at the stylus tip 23 compared with possible pivoting movement about the stylus pivot 71.

Various alternative reprogramming arrangements are possible. For example, the PC 333 may be directly plugged into the serial data socket 47. Such a connection is sometimes provided in any case to allow control of the instrument through a PC or to allow a PC to capture measurement data output by the instrument. Such a connection simplifies the reprogramming operation as the PC disk drive 335, the disk 337 and the portable disk reader 339 are not used. However, such an arrangement may be less convenient if the personal computer 333 is not already close to the instrument or if several instruments are to be reconfigured by loading the same set of replacement programs into them.

We claim:

1. A metrological instrument for measuring a characteristic of a surface, the instrument comprising: an arm for holding a stylus and traversing the stylus over a workpiece; an electronic circuit means for connection to a coil of an inductive transducer arranged so that movement of a tip of a stylus held by said arm causes relative movement between the coil of the transducer and a core for the coil, the circuit means comprising a component which is adjustable in response to a control signal so as to alter a parameter of the component and thereby affect the operation of the circuit means, and the metrological instrument having a mode of operation in which it generates the aforementioned control signal in response to an error in the operation of the circuit means, thereby to adjust the component automatically so as to reduce the error.

2. An instrument according to claim 1 in which the component is settable to retain its adjustment setting in the absence of power.

3. An instrument according to claim 1 for use when the coil of the transducer is tapped at first and second points and a third point intermediate the first and second points, and the current in the coil is caused to oscillate in use,
   in which the adjustable component is arranged for connection in a path between two of the taps of the coil to compensate for inaccuracies in resistance of the part of the coil between the first tap and the third tap relative to the resistance of the part of the coil between the second tap and the third tap.

4. An instrument according to claim 1 for use when the current in the coil of the transducer is caused to oscillate in use, in which the circuit means is arranged to compare first and second signals each obtained by combining signals from a plurality of points along the coil, and the adjustable component is connected to alter the phase of one of the first and second signals.

5. An instrument according to claim 1 for use with the coil having first and second taps, in which the circuit means comprises a first node for connection to the first tap of the coil, and a second node for connection to the second tap of the coil, and signal output means connected to the first and second nodes for providing first and second output signals from the signals appearing at the nodes in use.

6. An instrument according to claim 1 in which the adjustable component is resistive.

7. An instrument according to claim 6 in which the adjustable component comprises a potential divider including a distributed resistance which is tapped between its end points, and said adjustable component is adjustable to vary the effective position at which said distributed resistance is tapped.

8. An instrument according to claim 4 in which the circuit means comprises a phase shift network and the adjustable component is connected into said phase shift network.

9. An instrument according to claim 8 in which the adjustable component comprises a potential divider including a distributed resistance having first and second end taps connected to respective points in the phase shift network at which there are different phase shifts, the distributed resistance additionally being tapped between the first and second end taps and the component is adjustable to vary the effective position at which said distributed resistance is tapped between the first and second end taps.

10. An instrument according to claim 4 in which relative movement of the core and the coil varies the amplitude of the first signal and adjustment of the adjustable component alters the phase of the second signal.

11. An instrument according to claim 3 in which the adjustable component comprises a potential divider having first and second ends and being tapped between the first and second ends, said first end of the distributed resistance being arranged for connection to the first tap of the coil, said second end of the distributed resistance being arranged for connection to the second tap of the coil, and the adjustment of the component varying the effective position at which the distributed resistance is tapped between the first and second ends.

12. An instrument according to claim 11 in which the adjustable component is arranged for connection of said effective position to the third tap of the coil.

13. An instrument according to claim 11 in which said effective position of the adjustable component is connected to a predetermined potential, and in which the circuit means comprises a connection for connecting the third tap of the coil to a predetermined potential.

14. An instrument according to claim 3 in which the circuit means comprises a first node for connection to the first tap of the coil, a second node for connection to the second tap of the coil, and signal output means for providing first and second output signals from the signals appearing at the nodes in use.

15. An instrument according to claim 5 in which the signal output means comprises means to sum the signals from the first and second nodes for providing the first output signal and to subtract the signals from the first and second nodes for providing the second output signal.

16. An instrument according to claim 14 in which the signal output means comprises means to sum the signals from the first and second nodes for providing the first output signal and to subtract the signals from the first and second nodes for providing the second output signal.

17. A metrological instrument according to claim 1, wherein the circuit means comprises means for comparing a reference signal with a measurement signal derived from the transducer to produce an error signal and means for deriving from the error signal the control signal for altering the parameter of the component.

18. A metrological instrument according to claim 17, further comprising means for sampling the error signal; means for integrating the sampled error signal, the integrating means having an input and an output providing an integrated error signal; first comparison means for comparing the integrated error signal with a positive threshold and providing a signal to the input of the integrating means; second comparison means for comparing the integrated error signal with a negative threshold and for providing a signal to the input of the integrating means; means for receiving the outputs of the first and second comparison means and for providing clock signals; a counter for providing in response to the clock signals a count; and means for deriving the reference signal by multiplying an oscillating signal by a number generated by a digital to analogue converter controlled by the count of the counter, which count represents the position of the core relative to the coil of the transducer.

19. A metrological instrument according to claim 1, wherein the circuit means comprises: means for multiplying an oscillating reference signal by a positive or negative number to produce a modified reference signal of the same amplitude but opposite phase to a measurement signal derived from the transducer; means for combining the modified reference signal and the measurement signal to provide an error signal; a counter controlled by the error signal in a negative feedback loop for generating a count providing the number by which the reference signal is multiplied, which count represents the position of the core relative to the coil of the transducer; and means for deriving from the error signal the control signal for altering the parameter of the component.

20. A metrological instrument for measuring a characteristic of a surface, comprising an arm for holding a stylus and traversing the stylus over a workpiece, and circuit means for receiving first and second signals from a coil of a transducer arranged so that movement of the stylus as it traverses over a workpiece causes relative movement between the coil and a core and the current through the coil is caused to oscillate in use, the circuit means comparing the amplitudes of the first and second signals, the circuit means comprising an adjustable element which is adjustable to affect the relative phase between the first and second signals in response to a control signal and the metrological instrument having a mode of operation in which the control signal is output to the adjustable component in response to a detected error in the phase between the first and second signals thereby automatically to adjust the component to reduce the phase error.

21. An instrument according to claim 20 in which the adjustable component is resistive.

22. An instrument according to claim 21 in which the adjustable component comprises a potential divider including a distributed resistance which is tapped between its end-points, and said adjustable component is adjustable to vary the effective position at which said distributed resistance is tapped.

23. An instrument according to claim 20 in which said circuit means comprises a phase shift network and the adjustable component is connected into said phase shift network.

24. An instrument according to claim 23 in which the adjustable component comprises a potential divider including a distributed resistance having first and second end taps connected to respective points in the phase shift network at which there are different phase shifts, the distributed resistance additionally being tapped between the first and second end taps and the component is adjustable to vary the effective position at which said distributed resistance is tapped between the first and second end taps.

25. An instrument according to claim 20 in which relative movement of the core and the coil varies the amplitude of the first signal and adjustment of the adjustable component alters the phase of the second signal.

26. An instrument according to claim 20 for use with a coil having first and second taps, in which the circuit means comprises a first node for connection to the first tap of the coil, and a second node for connection to the second tap of the coil, and signal output means connected to the first and second nodes for providing first and second output signals from the signals appearing at the nodes in use.

27. An instrument according to claim 26 in which the signal output means comprises means to sum the signals from the first and second nodes for providing the first output signal and to subtract the signals from the first and second nodes for providing the second output signal.

28. A metrological instrument for measuring a characteristic of a surface, the instrument comprising: an arm for holding a stylus and traversing the stylus over a workpiece; and circuit means for connection to a coil of a transducer associated with the stylus held by said arm so that movement of the stylus as it traverses over the workpiece causes relative movement between the coil of the transducer and a core, the circuit means comprising an oscillator having first and second outputs for connection to first and second taps of the coil, a first resistor in series with the first output of the oscillator, a second resistor in series with the second output of the oscillator, and an adjustable resistive component connected between the first resistor and the second resistor on their sides away from the oscillator.

29. An instrument according to claim 28 in which the first resistor is connected in series between the first output of the oscillator and a connection point for the first tap on the coil and the second resistor is connected in series between the second output of the oscillator and a connection point for the second tap of the coil.

30. An instrument according to claim 28 which has a mode of operation in which a control signal is output to adjust the component automatically.

31. An instrument according to claim 28 in which the circuit means is arranged to be connected to a third tap of the coil intermediate the first and second taps.

32. An instrument according to claim 31 in which the adjustable component comprises a potential divider having first and second ends and being tapped between the first and second ends, said first end of the distributed resistance being arranged for connection to the first tap of the coil, said second end of the distributed resistance being arranged for connection to the second tap of the coil, and the adjustment of the component varying the effective position at which the distributed resistance is tapped between the first and second ends.

33. An instrument according to claim 32 in which the adjustable component is arranged for connection of said effective position to the third tap of the coil.

34. An instrument according to claim 32 in which said effective position of the adjustable component is connected to a predetermined potential, and in which the circuit means comprises a connection for connecting the third tap of the coil to a predetermined potential.

35. An instrument according to claim 28 in which the circuit means comprises a first node for connection to the first tap of the coil, a second node for connection to the second tap of the coil, and signal output means for providing first and second output signals from the signals appearing at the nodes in use.

36. An instrument according to claim 29 in which the circuit means comprises a first node between the first resistor and the connection point for the first tap of the coil and second node between the second resistor and the connection point for the second tap of the coil, and the circuit means further comprises signal output means connected to the first and second nodes for providing first and second output signals from the signals appearing at the nodes in use.

37. An instrument according to claim 35 in which the signal output means comprises means to sum the signals from the first and second nodes for providing the first output signal and to subtract the signals from the first and second nodes for providing the second output signal.

38. An instrument according to claim 36 in which the signal output means comprises means to sum the signals from the first and second nodes for providing the first output signal and to subtract the signals from the first and second nodes for providing the second output signal.

39. A metrological instrument for measuring a characteristic of a surface, the instrument comprising: an arm for mounting a stylus and traversing it over a workpiece; and circuit means for connection to a coil arranged so that movement of the stylus as it traverses over the workpiece causes relative movement between the coil and a core, the circuit means comprising a capacitance for connection in parallel with the coil to form a tuned circuit, an oscillator for driving the tuned circuit, and resistors between the oscillator and the capacitance.

40. An instrument according to claim 39 in which the circuit means comprises signal output means for connection between said resistors and the ends of the coil for providing output signals from the signals appearing at the ends of the coil.

41. An instrument according to claim 39 comprising further resistor means for connection in parallel with the coil and in parallel with the capacitance.

* * * * *

UNITED STATES PATENT AND TRADEMARK OFFICE
CERTIFICATE OF CORRECTION

PATENT NO. : 5,740,616
DATED : April 21, 1998
INVENTOR(S) : Seddon et al.

It is certified that error appears in the above-indentified patent and that said Letters Patent is hereby corrected as shown below:

Column 1, line 52, "The-linkage" should read --The linkage--

Column 16, line 50, "value 3276B" should read --value 32768--

Column 17, line 31, "203 Will" should read --203 will--

Column 30, line 62, "workplaces" should read --workpieces--

Column 36, line 24, "a stylus" should read --the stylus--

Signed and Sealed this

Seventh Day of July, 1998

Attest:

*Attesting Officer*

BRUCE LEHMAN

*Commissioner of Patents and Trademarks*